| (12) | United States Patent<br>Wittenstein | | (10) Patent No.: US 7,693,339 B2<br>(45) Date of Patent: Apr. 6, 2010 |
|---|---|---|---|

(54) METHOD AND APPARATUS FOR FASTER-THAN-REAL-TIME LOSSLESS COMPRESSION AND DECOMPRESSION OF IMAGES

(76) Inventor: Andreas Wittenstein, P.O. Box 570, San Geronimo, CA (US) 94963-0570

( * ) Notice: Subject to any disclaimer, the term of this patent is extended or adjusted under 35 U.S.C. 154(b) by 795 days.

(21) Appl. No.: 11/007,960

(22) Filed: Dec. 8, 2004

(65) Prior Publication Data

US 2008/0219575 A1 Sep. 11, 2008

Related U.S. Application Data

(60) Provisional application No. 60/530,594, filed on Dec. 17, 2003.

(51) Int. Cl.
*G06K 9/36* (2006.01)
*G06K 9/46* (2006.01)
(52) U.S. Cl. ........................ 382/238; 382/232
(58) Field of Classification Search ........ 382/232, 382/238, 243
See application file for complete search history.

(56) References Cited

U.S. PATENT DOCUMENTS

| 5,675,382 | A | * | 10/1997 | Bauchspies | ............ | 375/240.25 |
|---|---|---|---|---|---|---|
| 5,680,129 | A | * | 10/1997 | Weinberger et al. | ............ | 341/65 |
| 7,369,707 | B2 | * | 5/2008 | Sakaguchi et al. | ............ | 382/239 |
| 2003/0058481 | A1 | * | 3/2003 | Bossen | ............ | 358/426.13 |
| 2003/0128140 | A1 | * | 7/2003 | Xie et al. | ............ | 341/107 |
| 2005/0053292 | A1 | * | 3/2005 | Mukerjee et al. | ............ | 382/236 |
| 2005/0281473 | A1 | * | 12/2005 | Kim et al. | ............ | 382/236 |

OTHER PUBLICATIONS

Memon et al. "Lossless compression of RGB color images", Optical Engineering, Jun. 1995, vol. 34 No. 6, pp. 1711-1717.*
Kobayashi et al. "Lossless compression for RGB color still images", Proceedings of International Conference on Image Processing, 1999. vol. 4, pp. 73-77.*
Kuo et al. "An efficient spatial prediction-based progressive image compression scheme", ISCAS 2000, IEEE International Symposium on Circuits and Systems, pp. III-33 to III-36.*

* cited by examiner

*Primary Examiner*—Samir A. Ahmed
*Assistant Examiner*—Li Liu
(74) *Attorney, Agent, or Firm*—Philip H. Albert; Townsend and Townsend and Crew, LLP

(57) ABSTRACT

Image compression wherein a spatial prediction filter combines two adjacent samples and a corner sample in the proportion 3:3:−2, or wherein chunked decode tables are used to decode embedded prefix codes more than one bit at a time. A spectral prediction filter might be used in conjunction with the spatial prediction filter. Chunked decode tables might be used in combination with simple prediction filters.

17 Claims, 26 Drawing Sheets

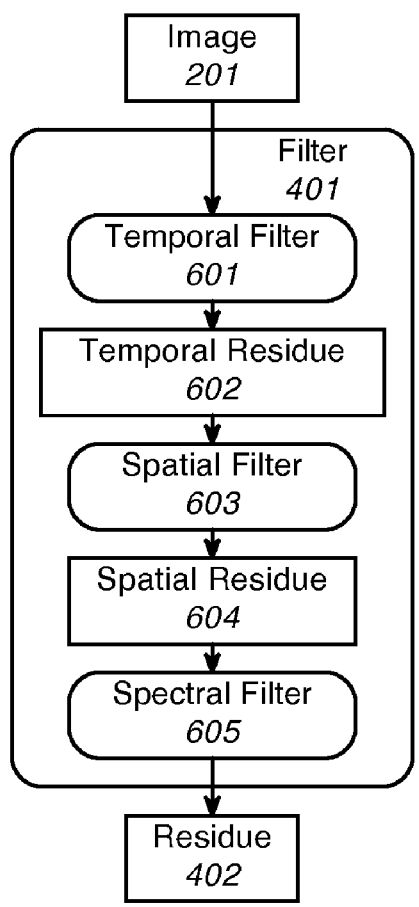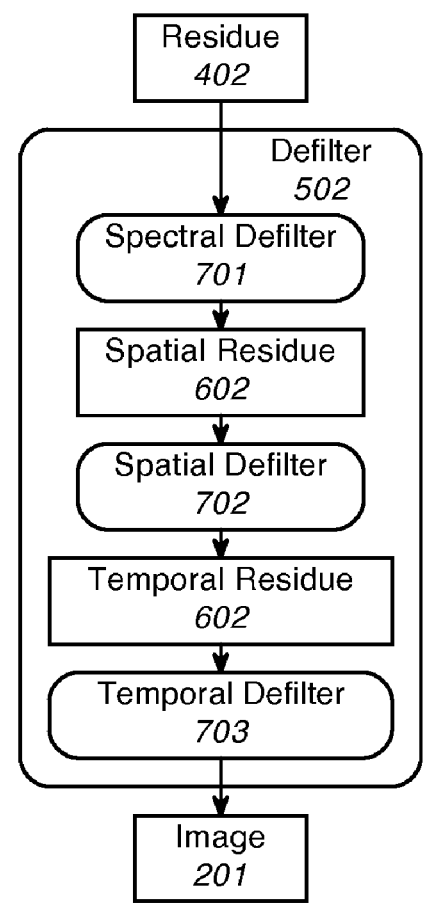

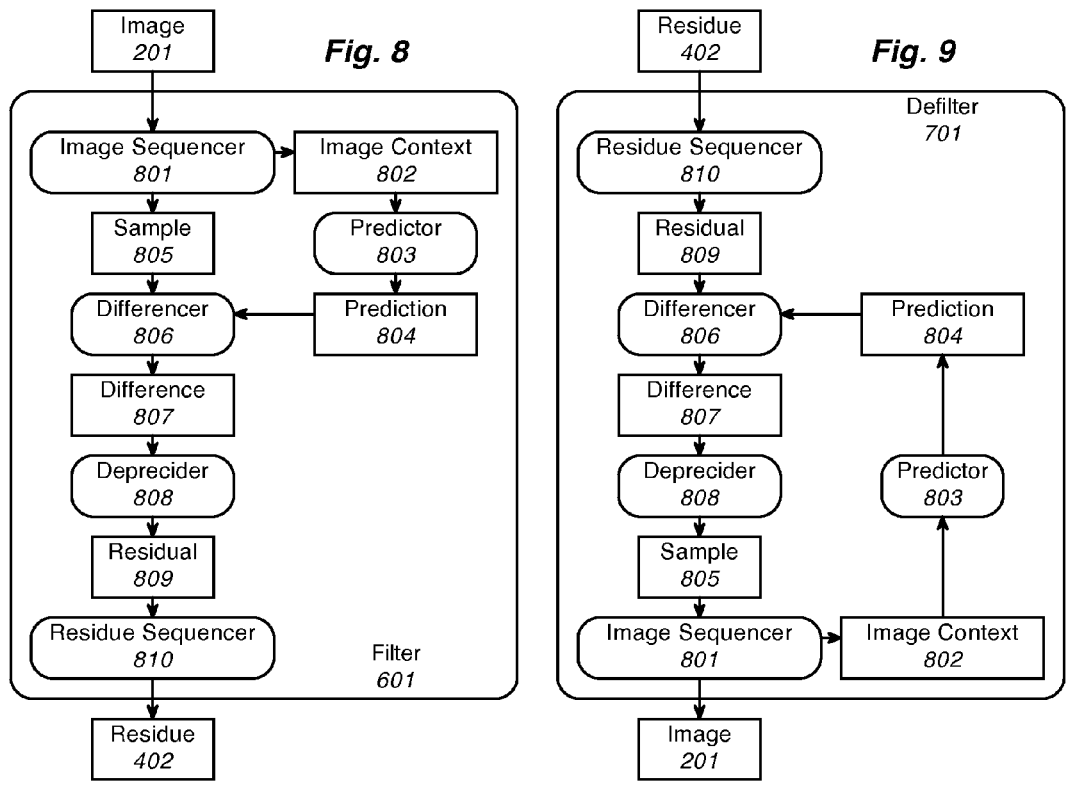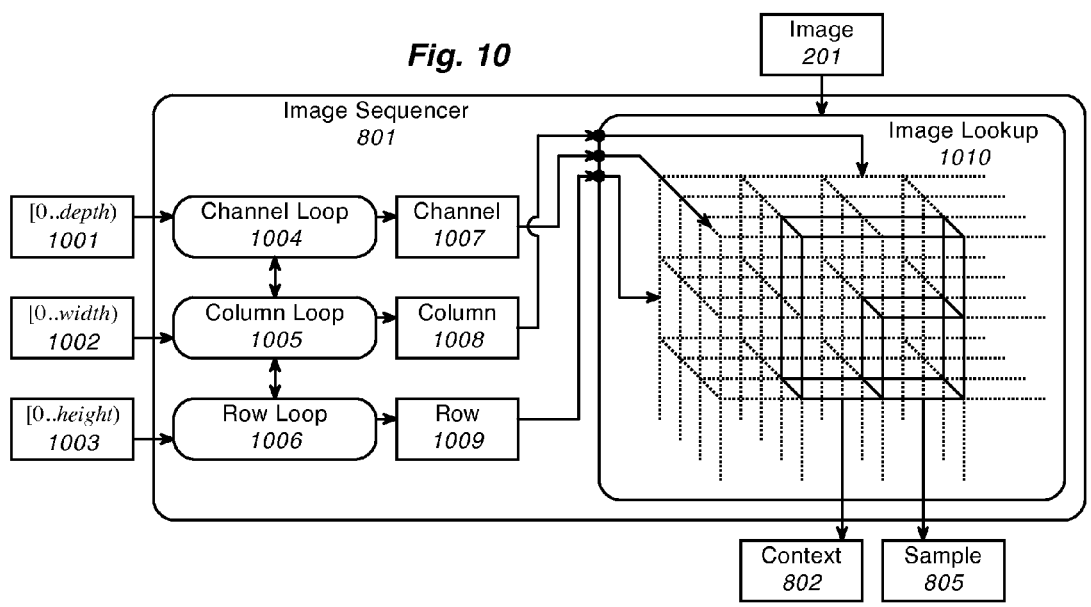

*Fig. 29*
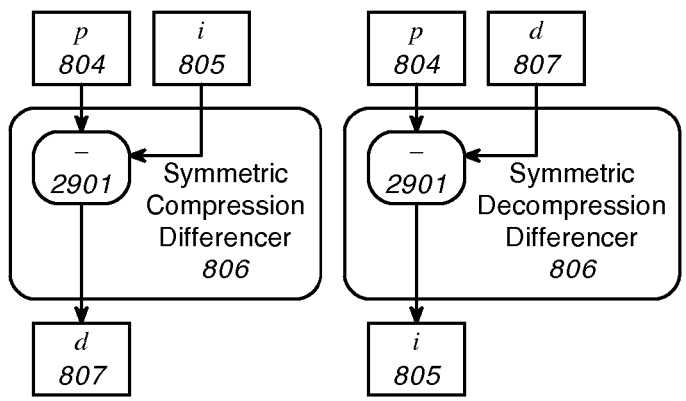
*Fig. 30*
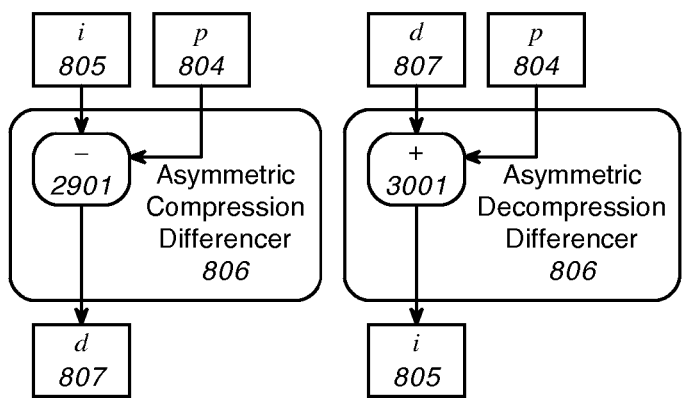
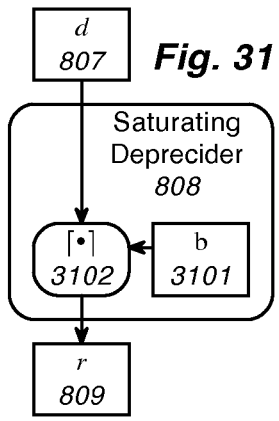
*Fig. 31*
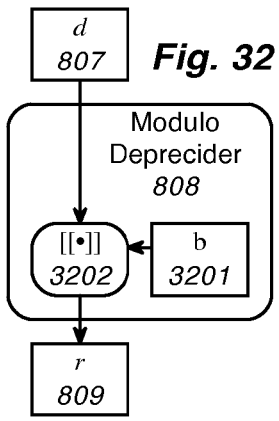
*Fig. 32*
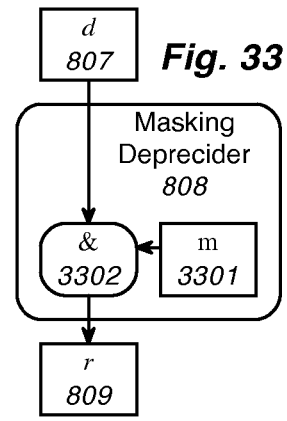
*Fig. 33*

Spatial Context

Spectral Context

METHOD AND APPARATUS FOR FASTER-THAN-REAL-TIME LOSSLESS COMPRESSION AND DECOMPRESSION OF IMAGES

CROSS-REFERENCE TO RELATED INVENTION

This invention claims priority to Provisional Patent Application Ser. No. 60/530,594, entitled "Method And Apparatus For Faster-Than-Real-Time Lossless Compression And Decompression Of Images", filed on 8 Dec. 2003.

BACKGROUND OF THE INVENTION

1. Field of the Invention

This invention relates to the field of data compression and decompression, in particular to compression and decompression of still and moving digital color images.

2. Background Art

Various compression schemes have been developed to reduce the transmission bandwidth and storage requirements for image and video data without information loss. Prior-art compression schemes include LZW and PNG, JPEG-DPCM, PhotoJazz, JPEG-LS, fractals, and wavelets. Understanding of this invention depends on a background in prior-art theory and practice relating to color compression, spatial image compression, and temporal moving-image compression.

Data compression refers to any process wherein data is converted from a given representation into a smaller representation, that is, a format occupying fewer bits, from which it can subsequently be decompressed back to the original representation. Data compression systems are well known in the art, and are used to reduce the amount of space required to store the data and the amount of time or bandwidth to transmit the data. Although digital storage and transmission costs have decreased at a nearly constant geometric rate for 30 years, the demand for digital storage and transmission have increased at an even greater nearly constant geometric rate, so the need for compression can be expected to continue to increase. For many applications whose feasibility would otherwise be delayed for years, data compression is an early-enabling technology.

Because of the huge memory and bandwidth requirements of digital still images and even more so of digital moving images, data compression has become an essential component of most digital imaging systems. Digital image compression systems are broadly classifiable into lossless (reversible) methods, which compress the image by packing the information more efficiently and yield the identical original image on decompression; versus lossy methods, which "compress" the image by discarding information that may be perceptually less important and on decompression yield a stand-in image which is generally still recognizable by the human visual system and retains its perceptual quality to varying degrees. The compressive power of lossless image compressors is limited by the inherent information (entropy) of the images; for R'G'B' photoquality naturalistic imagery, the mean compression power of existing systems ranges from around 1.4 for DPCM and 1.6 to 1.8 for string-matching algorithms such as LZW and PNG, through 2.2 for wavelet and fractal methods such as STiNG and LuraWave, up to 2.5 for PhotoJazz. The present invention, with a mean compression power of around 2.2, is thus comparable to the best of prior art. In contrast, there is no theoretical limit to the compressive power of lossy algorithms, although achieving infinite compressive power, by discarding all specific image information, forfeits all ability to distinguish between different images. Lossily compressed images are generally suitable only for direct viewing, and not amenable to further processing. Lossless compression is preferred or required for images that are difficult or impossible to replace or may undergo further processing, such as medical, scientific, satellite, and many other digital images. Lossless compression is also required to avoid cumulative loss in the storage of intermediate images in editing and other multistep processing.

A digital image specifies a discrete pixel value as a function of two discrete spatial variables, commonly referred to as the vertical and horizontal dimensions. Sometimes, such as in scanning for tomography, a third spatial dimension, often referred to as the longitudinal dimension, is added, the longitudinal sequence of slices comprising a 3-dimensional image. Often a time dimension is added, yielding a moving image. The pixel value itself may be a scalar, yielding a one-component image, or a vector, yielding a multicomponent image; for visual images, these are commonly known as monochrome (or grey-scale) and polychrome (or multispectral) images, respectively, the most common case being a trichrome image with spectral components RGB (Red,Green,Blue), corresponding to the spectral resolution of the human visual system. Often the pixel also includes relatively unrelated channels, such as alpha channels or spot-color channels.

In lossless digital image compression, the pixels are conceptually often compressed and decompressed one at a time, in a particular scan order, such as early to late (for a moving image), front to back (for a 3-d image), top to bottom, and left to right. Within a pixel, however, the components are almost always compressed and decompressed independently. In compression, imposing a scan order permits prior image and residue samples to serve as a causal context for prediction filters and probability models. In some schemes, the image is tiled into independently compressed blocks of data, facilitating random access to portions of the image and enhancing the parallelizability of the compression process, but at the cost of reduced compressibility.

Some lossless image compressors of prior art use a quantitative predictor to improve the performance of a subsequent encoder which encodes the prediction residue instead of the original image. For example, the current lossless image-compression standards TIFF-LZW, JPEG-DPCM, and PNG all optionally use a simple predictor (such as the value of the corresponding component of the preceding pixel) prior to encoding. The use of a slightly larger context, where the predicted value is a numerical combination of contextual values, is also known. For example, PNG optionally uses either 1 or a combination of 3 contextual samples, JPEG-DPCM offers a choice of 7 predictors, using either 1 or a combination of 2 or 3 contextual samples, and JPEG-LS uses a combination of 4 contextual samples. In some predictors, the numerical combination is based on analysis of the entire image (for example, by one-dimensional or separable two-dimensional autoregression) or a substantial portion thereof, such as a scanline (for example, by trying several different ones and choosing the one yielding the highest compression); in others, the numerical combination is fixed, on the basis of similar analysis of representative data.

JPEG-DPCM was internationally adopted in 1994 as part of ISO/IEC DIS 10918-1. JPEG-LS, formerly known as LOCO, and currently under consideration as a standard by ISO/IEC JTC1/SC29/WG1, is described in U.S. Pat. No. 5,680,129, "System and Method for Lossless Image Compression", by Weinberger, Seroussi, and Sapiro. PNG was internationally adopted in 1996 by the World Wide Web Consortium. The LZW technique on which TIFF-LZW is based is taught by U.S. Pat. No. 4,558,302, "High Speed Data Compression and Decompression Apparatus and Method", by Welch.

Lossy image compressors of prior art, in contrast, commonly compress an entire tile, or group of pixels, at a time, by comparing it to other tiles. In vector-quantization compressors, a distance measure is used to compare the tile to a set of known tiles, such as prior tiles or tiles in a codebook, and a single best representative is chosen. For example, in the Pyx moving-image compressor, as disclosed in U.S. Pat. No. 5,734,744, "Method and Apparatus for Compression and Decompression of Color Data", by Wittenstein, Hourvitz, et al., tiles which have changed sufficiently from the base frame and the previous frame are encoded by the index of the closest-matching tile in a dynamic tile table. In transform compressors, on the other hand, a correlation measure is used to compare the tile to a set of abstract basis tiles, and encoded as a numerical combination of some of those basis tiles. For example, the current lossy still-image compression standard, JPEG-DCT, and the current lossy moving-image compression standard, MPEG, both use a digital cosine transform, in which the tile is encoded as a weighted combination of cosine tiles, where the weights are determined from the correlation of the encoded tile with the cosine tiles. JPEG-DCT was internationally adopted in 1994 as part of ISO/IEC DIS 10918-1.

With care, a transform compressor can be made perfectly reversible, in which case the method can be applied for lossless compression. For example, the wavelet compressor disclosed in U.S. Pat. No. 5,748,786, "Apparatus for Compression Using Reversible Embedded Wavelets", by Zandi, Allen, Schwartz, and Boliek, can losslessly compress images.

Some lossless image compressors of prior art, such as PhotoJazz, JPEG-LS, and Sunrise, reduce the coding context using topologically constrained splitting or clustering methods, in which contiguous neighborhoods of values in native context space are mapped to single values in the reduced space.

One of the chief disadvantages of existing prior-art lossless and lossy image compression schemes alike is their slowness. Even on top-of-the-line personal computers, existing lossless compressors, including PNG, JPEG-LS, PhotoJazz, STiNG, and JPEG-2000 are currently 10 to 20 times too slow for standard-definition video rates such as NTSC and PAL. Likewise, existing high-quality lossy compressors such as Photo-JPEG, MotionJPEG, DV, and Sorensen, are 3 to 100 times too slow at their highest quality settings for real-time editing on commodity hardware. For high-definition video, prior-art compression schemes for photoquality images are tens or hundreds of times too slow.

SUMMARY OF THE INVENTION

The present invention is a method and apparatus for compressing and decompressing data. In particular, the present invention provides a method for compressing standard- and high-definition naturalistic photo-quality image data in faster than real time without information loss, whether in software on personal computers, or in a featherweight digital circuit embedded in cameras and other imaging devices. The present invention uses a nearly symmetrical compression-decompression scheme, wherein both directions take about the same amount of time and computing resources—although the decompressor uses somewhat more data memory than the compressor. The compressor and decompressor are optimized to maximize the compression ratio attainable on current consumer-level general-purpose computers in real time, while minimizing the demand on system resources such as code space, data space, image cache space, memory bandwidth, bus bandwidth, processor precision, and processor complexity.

The present invention compresses image data in two or three steps, first condensing the image with a filter to produce a residue, then optionally reducing the residue context, and finally encoding the residue into a stream of variable-bit-length codes. In the decompressor, the bitstream is decoded into the identical residue, which is then defiltered into the identical original image. The condensation step greatly reduces the low-order distribution of sample values, facilitating the use of a low-order encoder in the second step.

The condensor provides temporal, spatial, and spectral compression using a quasilinear one-sided prediction-error filter, feedforward in the compressor, feedback in the decompressor. In the preferred embodiment of the invention, the compression filter is implemented as a cascade of quasilinear feedforward filters, with temporal, multidimensional spatial, and spectral stages, where appropriate, in that order, to minimize computation and storage of intermediate values. The decompressor cascades quasilinear feedback inverse filters in the reverse order. The quasilinear filters are implemented using only the trivial integer operations of addition, subtraction, and either one-dimensional table lookup or constant multiplication and binary shifting, depending on the computing environment. For a general-purpose computer containing a fast multiplier, multiplication and shifting is often faster and uses less memory. The filter coefficients are chosen to be small integers, so that low-level hardware or firmware can implement the multiplications with a couple of shifts and adds. For a custom embedded processor, tables may be faster and take less chip real estate, and filter tables permit the data precision to be constrained to that of the image samples throughout the compressor and decompressor, at only a slight cost in compression power. The filter support consists of adjacent causal samples of the respective image. The numerical combination is based on the novel technique of true (non-separable) multidimensional analysis of representative data, yielding different filter coefficients for different types of data, such as R'G'B' versus $Y'C_BC_R$, 4:4:4 versus 4:2:2, progressive versus interlaced. It is noteworthy that, because of their true multidimensional basis, the resulting optimal filter coefficients are quite different from any taught in prior art. In the preferred embodiment, the filter is applied in the native scan order of the image processing environment, permitting on-the-fly compression and decompression with a mere one-sample latency and minimal buffer size. Where necessary, the output of the final filtering stage is deprecided to match the precision of the original image samples. In the preferred software embodiment, this depreciation is accomplished by a simple 'and'-mask in two's-complement representation, yielding a modulo arithmetic result. In a custom hardware implementation with appropriately constrained data path width, no explicit depreciation is needed to achieve this modulo arithmetic result. Saturation arithmetic yields slightly higher compression power, but is generally more expensive to implement.

The encoder uses a table of prefix codes approximately inversely proportional in length to their probability. The decoder, rather than decoding one bit at a time as in prior-art prefix-code recognition, uses novel chunked decode tables for accelerated lookup, permitting it to decode several bits at once, usually comprising the whole codeword. For speed and table compactness, the preferred chunk size is one byte. This efficient chunking technique requires forcing all codes with the same prefix chunk to have equal length, a constraint making it particularly nonobvious. Likewise, the code lengths are preferably limited to 1 chunk longer than the samples, for speed and compactness of code and tables. In the fastest and simplest mode, the code and decode tables are context-independent but channel-specific. Higher compression-power settings, at the cost of a reduction in speed and an increase in table size, use context-specific code tables dependent on temporal, multidimensional spatial, and spectral adjacent causal residue samples, as appropriate. To minimize overall table size, contexts with similar probability distributions are incoherently collapsed by a context reducer using one-dimensional lookup tables followed by implicitly multidimensional lookup tables. These context-reduction tables impose no topological constraints on the context mappings.

BRIEF DESCRIPTION OF THE DRAWINGS

FIG. 6 is an information-flow diagram of the filter in FIG. 4.

FIG. 7 is an information-flow diagram of the defilter in FIG. 5.

FIG. 8 is an information-flow diagram of any of the filter stages in FIG. 6.

FIG. 9 is an information-flow diagram of any of the defilter stages in FIG. 7.

FIG. 10 is an information-flow diagram of the image sequencer in FIGS. 8 and 9 for a 2-dimensional color image.

FIGS. 29 and 30 are alternate information-flow diagrams of the differencer in FIGS. 8 and 9.

FIGS. 31, 32, and 33 are alternate information-flow diagrams of the deprecider in FIGS. 8 and 9.

DETAILED DESCRIPTION OF THE INVENTION

Figure 1:
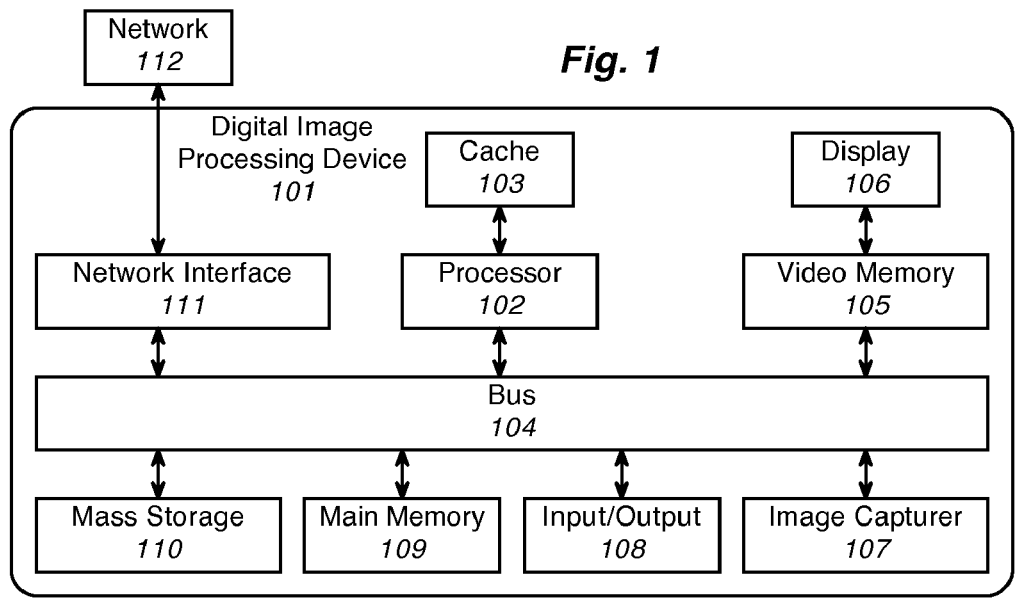
FIG. 1 is a diagram of an image processing device that may be used with an embodiment of the invention.

A method for compression and decompression of data is described. In the following description, numerous specific details, such as number of dimensions, pixel components, bits per sample, etc., are set forth in order to provide a more thorough understanding of the present invention. It will be apparent to one skilled in the art, however, that the present invention may be practiced without these specific details. In other instances, well-known features have not been described in detail, so as not to unnecessarily obscure the present invention.

In the preferred embodiment of the present invention, source image material consists of large high-precision multichannel images. These images may, for example, be taken by digital video or still cameras, digitized from slides or prints by a scanner, captured by other imaging devices, or be synthesized or edited with the aid of a computer. The source images may have 2 or more spatial dimensions, and may be still or moving images. The images may have multiple channels which may represent color spectral components, luma and chroma components, false-color components, or other spatially coherent quantitative information. In the case of digital video, the images may, for purposes of example, consist of 720-by-480-pixel images having 24 bit trichrome pixels with 8 bits each for red, green, and blue color components, at a rate of 29.97 frames per second, as appropriate for the NTSC standard. In the case of digital still cameras, to take another example, the images may be tens of thousands of pixels on a side, with 16 bits per color channel. Although the preferred embodiment uses large high-precision polychrome images, small, low-precision, or monochrome images can also be used with this invention.

In the preferred embodiment of the present invention, the entire image is conceptually compressed sequentially in a particular scan order, utilizing all available dimensions of causal context to maximize the compression ratio. Thus later spectral channels of a multichannel image are dependent on earlier spectral channels, later pixels in a row are dependent on earlier pixels, later rows are dependent on earlier rows, later slices in a 3-dimensional image are dependent on earlier slices, and later frames of a moving image are dependent on earlier frames. However, whenever random access to any parts of an image is desired, such parts can be compressed and decompressed independently, at the cost of poorer compression power, without departing from the scope or spirit of this invention. For example, individual temporal frames, spatial tiles, or longitudinal slices may be compressed and decompressed independently for convenience. In practice, although these conceptual dependencies dictate the actual processing order for this invention in decompression because the decompressor is strictly feedback, they do not affect the actual compression order in the fastest mode, the compressor and context-free encoder being strictly feed-forward.

The present invention compresses images with no loss, using a two-stage compression scheme that achieves a compression ratio comparable to the best prior-art image compression schemes, but in faster than real time, and with minimal use of processing complexity and memory.

Computer System

The present invention may be implemented as computer software on any conventional or general-purpose computer system capable of processing images, or on a special-purpose image-processing device such as a digital camera FIG. 1 illustrates a typical embodiment of a computer system or digital-image processing device for implementing this invention. Digital image processing device 101 features a central processor 102 with attached memory cache 103. Processor 102 communicates with other internal units via bidirectional system communications bus 104. Such other units commonly include video memory 105 with attached display 106 for human viewing of images and other information; image capturer 107 for inputting images directly into the computer; other input and output devices 108 such as keyboard, mouse, digital camera controls, audio input/output, etc; main random-access memory 109; mass storage 110 such as a hard disk; and network interface 111 for communicating with network 112 of other computer systems, including other image-processing devices. Any of these components, including the central processor and cache, can be absent or represented by multiple units of possibly different types.

Implementation of this invention on general-purpose computer systems is preferable whenever the images are synthesized, edited, displayed, or otherwise processed on a general-purpose computer system, and such implementations are much faster than prior art lossless image compressors that achieve comparable compression ratio. In fact, tests show that the present invention is fast enough to compress and decompress standard video formats (e.g. NTSC, PAL) in real time on all current consumer-level (i.e. personal computer) systems, and even the most demanding high-definition video formats (e.g. 1920×1080p at 30 f/s) on high-end personal computers.

Nevertheless, the present invention is designed to place featherweight demands on computational resources, so that it can easily be implemented on much simpler and cheaper processors as software, firmware, or hardware in an embedded system such as a video camera, still camera, scanner, printer, storage device controller, transmitter, or receiver, including a peripheral device for a general-purpose computer system. In particular, for any specific uncompressed format, the present invention requires only a few kilobytes each for code memory, data memory, and image cache memory; requires only integer arithmetic; requires processing precision no greater than the image sample precision; and requires no processing more complicated than addition, subtraction, masking, and shifting.

Further, the compressor is designed to be highly parallelizable, so that devices requiring image-processing data rates far beyond standard video rates, whether due to higher temporal, spatial, or spectral resolution, can still benefit from the present invention by using parallel processors to effect real-time compression and decompression. Parallel processing opportunities range from vector processing of individual pixels to loosely coupled processing of image tiles or frames.

Compression/Decompression

The compressor of the present invention compresses an image (such as a 24 bit R'G'B' image) into an encoded residue-image stream. The decompressor decompresses the encoding back into an identical copy of the original image.

Figure 2:
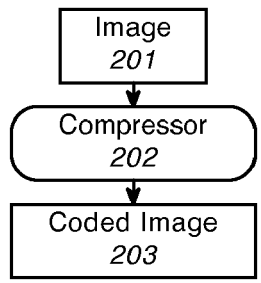
FIG. 2 is an information-flow diagram of the compression phase.
Figure 3:
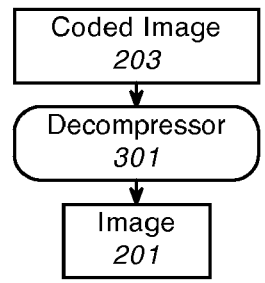
FIG. 3 is an information-flow diagram of the decompression phase.

FIG. 2 and FIG. 3 are top-level information-flow diagrams illustrating this reversible compression process. In the present invention, an image 201 is compressed by compressor 202 to lead to a coded image 203. The encoded image, decompressed by decompressor 301, recreates the identical source image 201.

Figure 4:
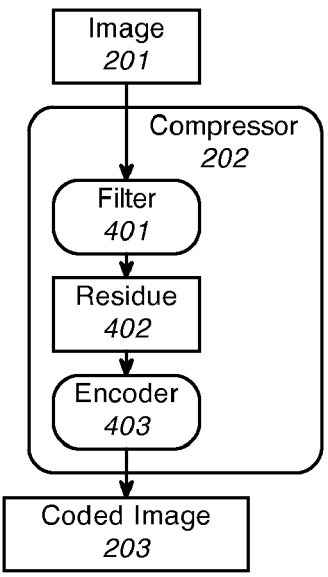
FIG. 4 is an information-flow diagram of the compressor in FIG. 2.
Figure 5:
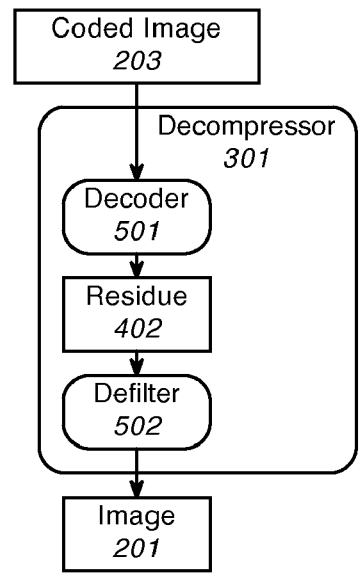
FIG. 5 is an information-flow diagram of the decompressor in FIG. 3.

FIG. 4 and FIG. 5 are information-flow diagrams illustrating the two main stages of compression and decompression respectively. In compression, the image 201 is first condensed by filter 401, yielding residue image 402, and then encoded by encoder 403. In decompression, the two stages proceed in reverse order, the encoded residue 203 being first decoded by decoder 501, recreating residue image 402, and then decondensed by inverse filter 502 to reproduce the original image 201.

Filtering/Defiltering

FIG. 6 and FIG. 7 depict the information flow for condensation filtering step 401 and defiltering step 502 in the preferred implementation. In condensation during compression, an image 201 is filtered by temporal filter 601 to yield temporal residue 602, which next passes through spatial filter 603 to yield temporospatial residue 604, which is finally filtered by spectral filter 605, yielding temporospatiospectral residue 402. In decondensation during decompression, temporospatiospectral residue 402 is first inverse-filtered by spectral defilter 701 to reconstitute temporospatial residue 602, which in turn is defiltered by spatial defilter 702 to yield temporal residue 602, which is finally passed through temporal defilter 703, exactly reproducing original image 201.

Those skilled in the art will recognize that the temporal, spatial, and spectral filters can be cascaded in any order, and any pair or all three can be preconvolved into a single filter. When the image data are stored in temporal-major channel-minor order, as is typically the case, the data can be filtered in a single pass with a minimum of redundant computation and intermediate storage by filtering temporally, spatially, and then spectrally in the compressor, and defiltering in the reverse order in the decompressor, as illustrated in FIG. 6 and FIG. 7. Furthermore, any component filter or filters can be omitted in both compressor and decompressor. For example, for video keyframes and for still images, the temporal filter is inapplicable; while for monochrome images, the first channel of polychrome images, and poorly correlated or uncorrelated channels such as alpha, spot-color, and luma-chroma channels, the spectral filter is unneeded; and for lower-dimensional spatial data, as at the leading edge of a planar image or the leading sides of a volumetric image, one or more dimensions of the spatial filter can be omitted. For interlaced video frames, it may likewise be preferable to omit the vertical dimension, especially in situations where the fields need to be individually accessible.

Each filter stage (temporal, spatial, and spectral) in compression is a causal feedforward (finite impulse response) filter. FIG. 8 illustrates the information flow for one compression filter stage, representing temporal filter 601, spatial filter 603, or spectral filter 605. In compression, an image 201 is sequenced by image sequencer 801, typically in scan order, to fetch, for each location in the image, sample 805 along with causal predictive context 802. From causal predictive contextual samples 802, predictor 803 computes predicted sample value 804. Differencer 806 compares predicted sample value 804 to actual sample value 805, to yield the prediction error, difference 807. Where necessary or desirable, depreciser 808 then reduces the precision of difference 807 to the original image sample precision, yielding residual 809. Residue sequencer 810 combines the residuals from different image locations to produce residue image 402.

Each defilter stage in decompression is a causal feedback (infinite impulse response) filter that is the exact inverse of the corresponding filter stage. FIG. 9 illustrates the information flow for one decompression filter stage, representing spectral defilter 701, spatial defilter 702, or temporal defilter 703. In decompression, residue sequencer 810 sequences residue image 402 to produce, for each location in the image, the residual 809 for that location. Differencer 806 compares predicted sample value 804 to residual value 809 to yield difference 807, which, where necessary or desirable, is reduced by depreciser 808 to the precision of the original image samples, yielding reconstituted sample 805. Image sequencer 801 stores this sample in the appropriate location in the reconstituted image, fetching the corresponding causal predictive context 802 for predictor 803. Predictor 803 processes causal contextual samples 802 to yield the exact same prediction 804 as during compression.

On a general-purpose processor, depreciser 808 is in principle optional except in the final stage of the (de-)filter. In a custom hardware embodiment, the preferred implementation uses data paths of the exact desired precision, so no extra deprecision step is necessary at all.

Image & Residue Sequencing

The information flow for image sequencer 801 in FIG. 8 and FIG. 9 for a 2-dimensional still color image is shown in FIG. 10. Channel sequencer 1004 loops through every channel 1007 in the image's depth 1001, while column sequencer 1005 loops through every column 1008 in the image's width 1002, and row sequencer 1006 loops through every row 1009 in the image's height 1003. Image lookup facility 1010 indexes into image 201 by current channel index 1007, column index 1008, and row index 1009 to yield context 802 and sample 805. Note that, for any filter stage, no context is required for the residue (i.e. the filter output and defilter input), so the residue sequencer can be simpler than the image sequencer. Additional dimensions, such as a third spatial dimension or a temporal dimension, are handled analogously to the three shown here.

Figure 64:
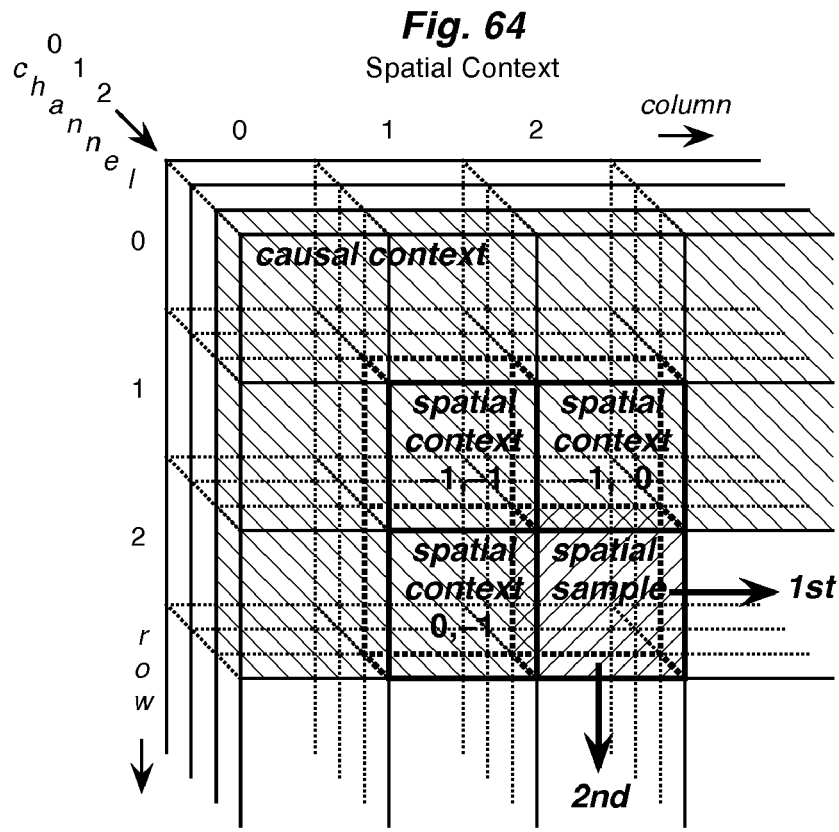
FIG. 64 is a diagram of the context for the spatial filter for a 2-dimensional image.

The spatial (de-)filter can be applied to the image in any causal sequential orientation and order. It can be applied to the channels in any order with identical results, because it operates on only one channel at a time. If the entire input image area is available in memory, then the strictly feedforward compression filter can be applied to a given channel in any spatial order, because its causal support is drawn entirely from the input. In a parallel-processing environment, it can be advantageous to filter several pixels at once. In contrast, the inverse filter in the decompressor, being strictly feedback, is causally constrained in each spatial dimension, since its spatial support extends in each dimension and is drawn entirely from the output. Hence the defilter cannot be applied in parallel within a dependent sequence. The orientation and order of application of the defilter must be causally consistent. Because the spatial filter is (as described later) quasilinear and spatially symmetrical, applying the appropriately oriented inverse filter in different sequential orders, whether left-to-right or right-to-left, top-to-bottom or bottom-to-top, row-major or column-major, yields equivalent yet different results. To be perfectly reversible, the same filter orientation must be used in the decompressor as in the compressor. The preferred spatial order for real-time applications is scanning order, which is typically row-major, top-to-bottom, and left-to-right. Ideally, the image should be stored in this order in memory. Given this scanning order, the orientation of the predictive spatial context must be above and to the left of the predicted sample. FIG. 64 shows the context used by the spatial predictor for a 2-dimensional color image, along with the primary and secondary spatial directions of application. Specifically, the predictive spatial context used by the present invention, to the extent available and applicable, consists of: the sample in the previous column, with the relative location of $(h,v)=(0,-1)$; the sample in the previous row, whose relative location is $(-1, 0)$; and the sample in the previous column and row, in relative location $(-1, -1)$. For a constant quasilinear filter, larger spatial contexts yield negligible increase in compression power at the cost of increased use of system resources, particularly time.

Figure 65:
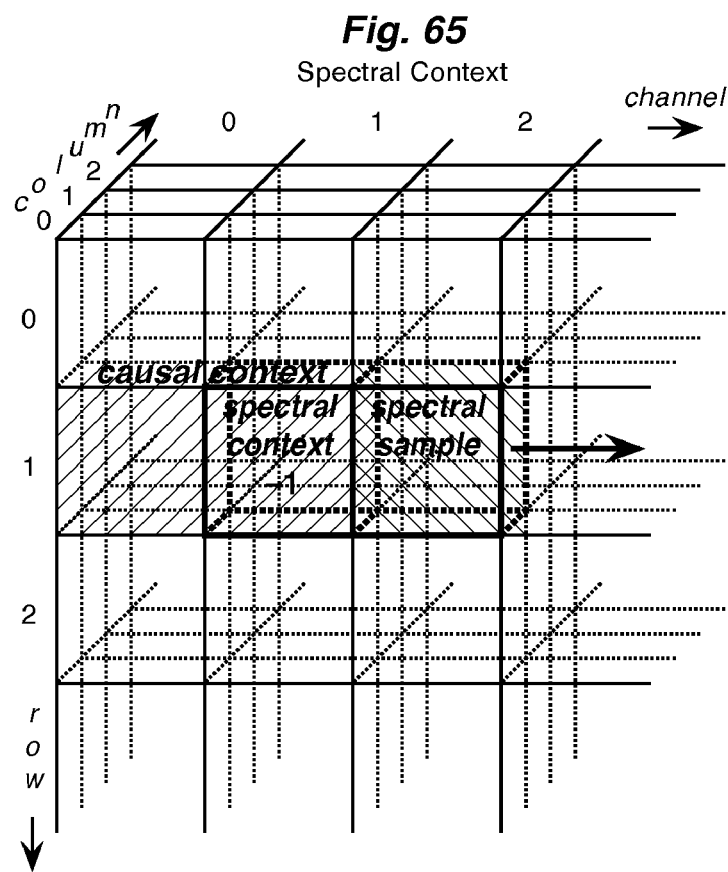
FIG. 65 is a diagram of the context for the spectral filter.

The spectral (de-)filter can likewise be applied to the image in any causal sequential orientation and order. Applying it to pixels in any order yields identical results, because it operates on only one pixel at a time. The strictly feedforward compression filter can be applied to a pixel in any spectral order. However, the spectral defilter is causally constrained across spectral channels. Because the spectral filter is quasilinear (as shown later), applying the appropriately oriented filter back-to-front or front-to-back yields different but equivalent results. The preferred spectral order is in scan order, typically in order of increasing frequency (decreasing wavelength). Given this scanning order, the orientation of the spectral context must be toward the red from the predicted component FIG. 65 shows the context used by the spectral filter and the direction of application. Specifically, the predictive spectral context used by the present invention consists of the sample in the previous spectral channel, when available. For a constant quasilinear filter, larger spectral contexts yield negligible increase in compression power at the cost of increased use of system resources, particularly time. For uncorrelated or decorrelated channels, such as alpha channels, spot-color channels, and the luma and chroma channels of images in $Y'C_BC_R$ space, employing a quasilinear spectral filter in the compressor is generally not worthwhile, as it yields negligible increase in compression power.

Prediction

At the leading edges of the image, not all the normal context used by the spatial predictor is available. There are two equivalent convenient ways to deal with the initial boundary conditions for the spatial predictor either bypass the normal filter kernel and shunt to the simpler boundary predictor appropriate to the remaining causal context, or fill in the missing contextual values from the nearest remaining causal context element and use the same filter kernel. The two methods produce identical results. In a sequential computing environment, the shunting predictor is generally faster, while the uniform kernel is more compact. In a custom hardware implementation, the uniform kernel is generally more efficient. Because the filtered signal has a zero mean whereas images generally have a nonzero mean, samples with no causal context (e.g. the top left pixel if the spatial filter is applied first, the first spectral component if the spectral filter is applied first) must be predicted ex nihilo using an empirically or theoretically derived ensemble mean.

Figure 11:
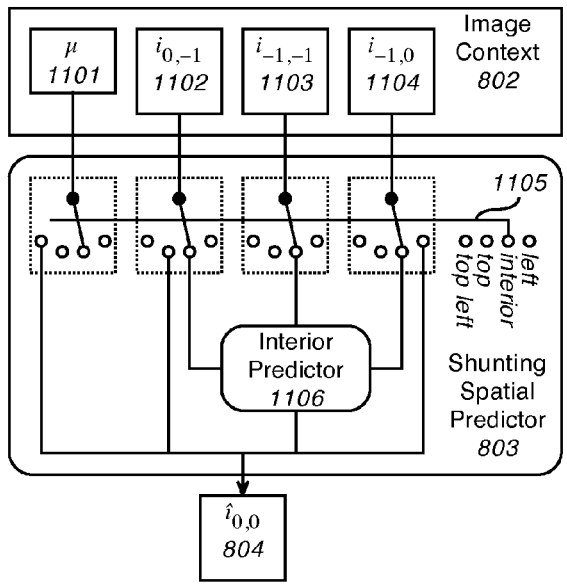
FIGS. 11 and 12 are alternate information-flow diagrams of the predictor in FIGS. 8 and 9 for a 2-dimensional spatial filter.

FIG. 11 illustrates a shunting spatial predictor. Switch 1105 assumes one of 4 states, depending on the boundary conditions: top left, top, left, and interior. In the top left state, ensemble mean µ 1101 is directly connected to the output, and all other inputs are disconnected. In the top state, left contextual sample $i_{0,-1}$ 1102 is directly connected to the output, and all other inputs are disconnected. In the left state, top contextual sample $i_{-1,0}$ 1104 is directly connected to the output, and all other inputs are disconnected. In the interior state (illustrated), left sample $i_{0,-1}$ 1102, top left sample $i_{-1,-1}$ 1103, and top sample $i_{-1,0}$ 1104 are all connected to interior predictor 1106, and ensemble mean 1101 is disconnected.

Figure 12:
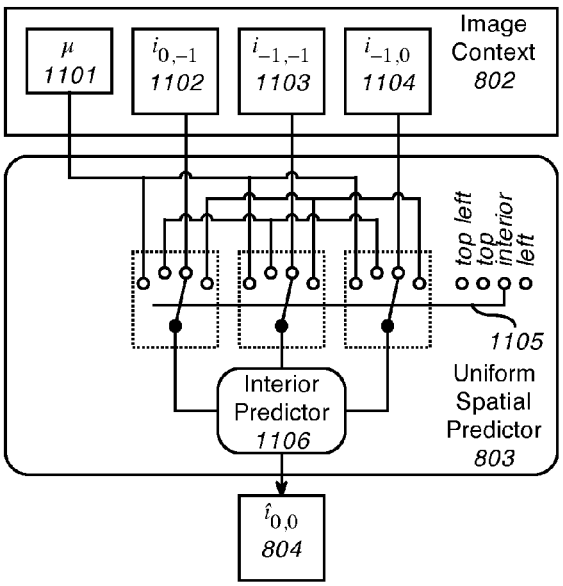

FIG. 12 depicts a uniform-kernel spatial predictor. Again, switch 1105 assumes one of 4 states, depending on the boundary conditions: top left, top, left, and interior. In the interior state (illustrated), each of the inputs to interior predictor 1106 is connected only to the appropriate spatial contextual sample, and none is connected to ensemble mean 1101. In the left state, all three inputs are connected only to top sample $i_{-1,0}$ 1104. In the top state, all three inputs are connected only to left sample $i_{0,-1}$ 1102. In the top left state, all three inputs are connected only to ensemble mean µ 1101.

Figure 13:
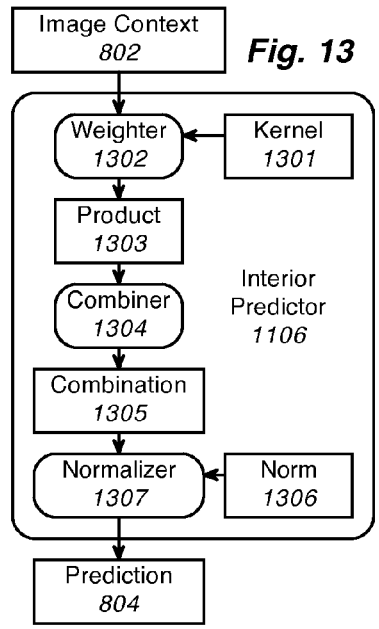
FIG. 13, 14, 22, 23, 24, 27 are alternate information-flow diagrams of the interior predictor in FIGS. 11 and 12.

The interior predictor presents the most complicated case. For single dimensions such as time, spectrum, and the edges of the image space, the optimal quasilinear predictor is simply equal to the immediately preceding sample. But for multiple dimensions such as the spatial interior of a 2-dimensional image, the optimal quasilinear predictor involves a multidimensional kernel. FIG. 13 illustrates the general form of such a predictor. Filter context 802 is shaped by filter kernel 1301 using weighter 1302, producing weighted-context product 1303. The samples of product 1303 are then combined by combiner 1304, yielding sum 1305, a weighted combination of the context. Combination 1305 is then normalized by norm 1306 using normalizer 1307, yielding prediction 804.

In the present invention, the optimal interior predictor kernel varies according to the type of image data, such as R'G'B' versus $Y'C_BC_R$ 4:4:4 versus 4:2:2, progressive versus interlaced. However, for each such data type, there is a broad plateau at the optimum, so that the exact kernel is relatively immaterial as measured by compression power. Nevertheless, it is noteworthy that this plateau of optima is in a region not taught in prior art, and yields compressive power on a par with much more complicated predictors, such as triangular interpolation prediction (misleadingly known as "median prediction"), without any of the tests and branches or saturation arithmetic required by triangular interpolation. The breadth of this plateau permits the precise kernel to be chosen for computational efficiency in the face of disparate computational restrictions across different platforms—a vital consideration for a real-time compression interchange standard which needs to be available on all image-processing platforms. Thus, restricting the individual coefficients to small integers minimizes the complexity of the multiplication and the precision of the intermediate results for computing environments with limited word size; choosing symmetrical coefficients reduces the number of multiplications in sequential implementations; setting any of the coefficients to plus or minus an integral power of two permits replacing a multiplication with a simpler binary left shift where multiplication is more expensive; and setting one of the coefficients to unity obviates one multiplication altogether. Perhaps most importantly, choosing a set of coefficients whose sum is a power of two permits substituting a right shift for division in the normalization step, division being a much costlier operation than shifting on almost all platforms. However, this invention also includes fast alternatives to division usable even for nonbinary norms.

For critically sampled progressively scanned images, for example, the optimum plateau for compression power includes symmetrical small-integer predictor coefficient sets $(c_{0,-1}, c_{-1,0}, c_{-1,-1})/C = (5,5,-3)/7$, $(2,2,-1)/3$, and $(3,3,-2)/4$. Of these, $(5,5,-3)/7$ requires 1 addition, 1 subtraction, 2 multiplications and 1 division on a sequential processor; $(2,2,-1)/3$ requires 1 addition, 1 subtraction, 1 left shift, and 1 division; and $(3,3,-2)/4$ requires 1 addition, 1 subtraction, 1 multiplication, 1 left shift, and 1 right shift. Thus $(3,3,-2)/4$, which uses the least complex operations, is preferable for cross-platform compatibility. For the chroma channels of progressively scanned 4:2:2 images, in which the chroma channels are subsampled by a factor of 2 horizontally, the preferred set of predictor coefficients is $\{3,4,-3\}/4$, which likewise requires 1 addition, 1 subtraction, 1 multiplication, 1 left shift, and 1 right shift.

The preferred implementation of the computation steps in interior predictor 1106, especially of weighter 1302 and normalizer 1307, varies among different computing environments, even when the prediction filter kernel is chosen for compatibility and efficiency across platforms. For example, even if the kernel coefficients are all chosen to be (plus or minus) integral powers of two to permit implementing the weighter with binary left shifts, multiplication may still be preferable on a single-instruction multiple-data (SIMD) vector processor with a fast inner-product (multiply-and-accumulate) instruction which combines weighter 1302 and combiner 1304 into a single step. However, subtly different choices in the reference implementation of the interior predictor at the core of the invention can markedly affect its speed on different computing platforms. Given that the primary distinction of this invention is its unprecedented speed, being 20 to 50 times faster than any comparable lossless photoquality image compressor of prior art, its utility can be maximized by choosing the most appropriate reference implementation for each particular workflow. The critical component in the interior predictor is the normalizer, and for different computing platforms one of three different types of normalizer is optimal: the dividing normalizer, the shifting normalizer, and the table-lookup normalizer. While all three of these normalizer types can be made exactly compatible, optimizing the normalizer for the workflow-specific reference implementation simplifies that normalizer type at the expense of complicating the other types, so that the most efficient implementations of each type are mutually incompatible. In some workflow situations, the best choice may be to use different reference implementations during different phases of the workflow, with lossless conversion taking place at appropriate transitions. For example, whereas a featherweight table-lookup implementation may be most appropriate in a portable camera, a shifting normalizer may be best suited for editing, so the editing workstation could accept both forms as input but output only in its native format. The normalizer serves two purposes: to bring the combination to within the range of the input sample, and to discard low-order, fractional information. Somewhat surprisingly, the fractional bits, while arguably important for accuracy, are not needed for reversibility.

Figure 14:
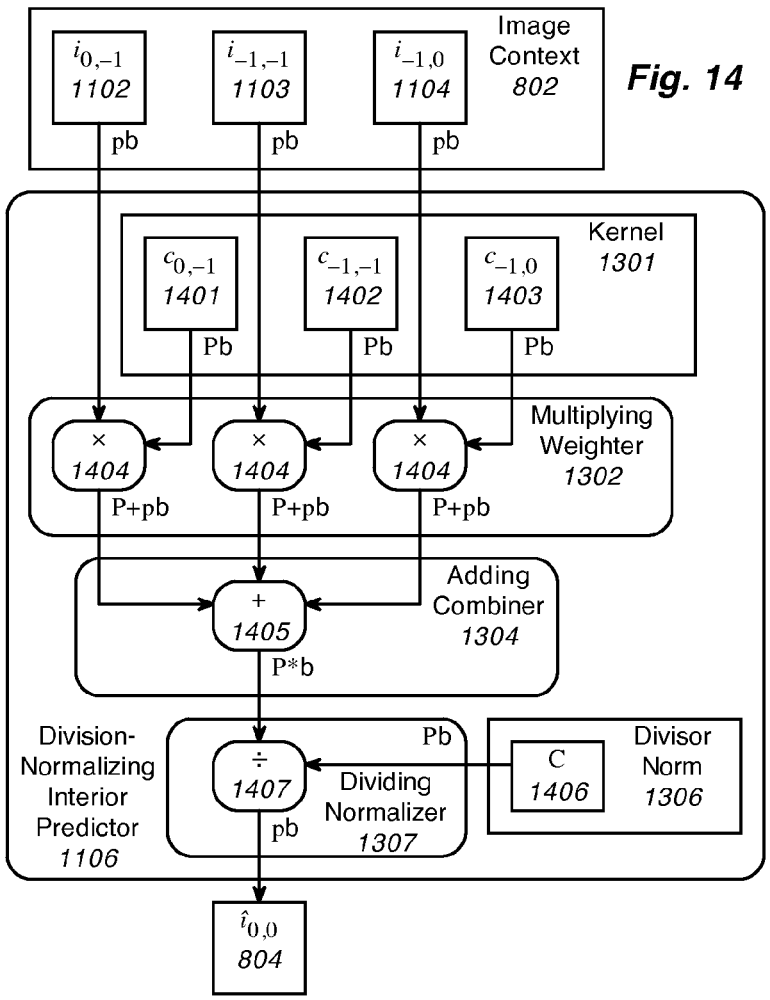

Conceptually the clearest implementation of the interior predictor is to use explicit multiplication, addition, and division for the weighting, combination, and normalization steps, respectively. This method also yields, by a slight margin, the highest compression ratio. However, since division is almost always more expensive than the alternatives described below, this method is only preferable as a reference implementation in situations where clarity is paramount, division is fast enough, or cross-platform compatibility is a minor concern. FIG. 14 depicts a division-normalizing implementation for the interior predictor of a 2-dimensional image.

$$\hat{i}_{0,0} = (i_{0,-1} \times c_{0,-1} + i_{-1,0} \times c_{-1,0} + i_{-1,-1} \times c_{-1,-1})/C$$

Here spatial context 802, consisting of p-bit samples $i_{0,-1}$ 1102, $i_{-1,-1}$ 1103, and $i_{-1,0}$ 1104, is multiplied by kernel 1301, comprising P-bit integer coefficients $c_{0,-1}$ 1401, $c_{-1,-1}$ 1402, and $c_{-1,0}$ 1403, respectively, using multiplying weighter 1302 consisting of p+P-bit two's-complement integer multiplies 1404, where $P = \lceil \log_2(\max(c_{y,x})) \rceil + 1$, and $\lceil \cdot \rceil$ denotes the ceiling. Note that the precisions given here (e.g. p bits and P bits) are intrinsic data precisions; The actual data path precisions used to represent these and other data types may be larger as convenient. The results of these multiplies are accumulated by combiner 1304, constituting P*-bit two's-complement integer adder 1405, where $P^* = p + \lceil \log_2(\Sigma c^+_{y,x} | c^+_{y,x} > 0) \rceil + 1$, the extra bit being needed only in case the image data are unsigned. The sum is then normalized by two's-complement integer divide 1407 in division normalizer 1307, where the norm 1306 is implemented as divisor $C = c_{0,-1} + c_{-1,0} + c_{-1,-1}$ 1406, to yield spatial prediction $\hat{i}_{0,0}$ 804. While the dividend precision for divide 1407 must be at least P*, the output precision, as explained below, need be no greater than p, the precision of the image samples, even though this results in overflow wrapping. In a SIMD vector processing environment, multiplies 1404 can be performed in parallel, as can adds 1405. On a sequential or superscalar processor, multiplies 1404 and adds 1405 are performed in arbitrary causal sequence, and all multiplies may be performed by the same multiply unit. For symmetrical kernels, for example $c_{0,-1} = c_{-1,0}$ for a 2-dimensional image, it is generally more efficient in non-SIMD environments to first add the corresponding samples, e.g. $i_{0,-1}$, $i_{-1,0}$, with a p+1-bit adder and then scale that partial sum with a P+p+1-bit weighter before adding the weighted partial sum with the other weighted term(s).

Figure 15:
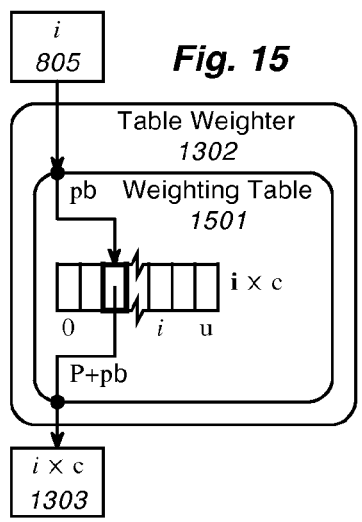
FIGS. 15 and 16 are alternate information-flow diagrams of the term weighter in FIG. 14.
Figure 16:
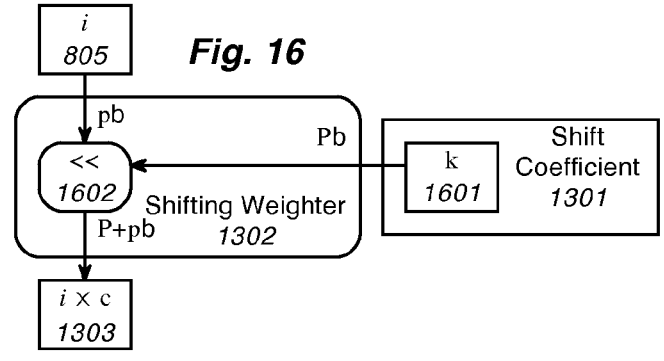
Figure 18:
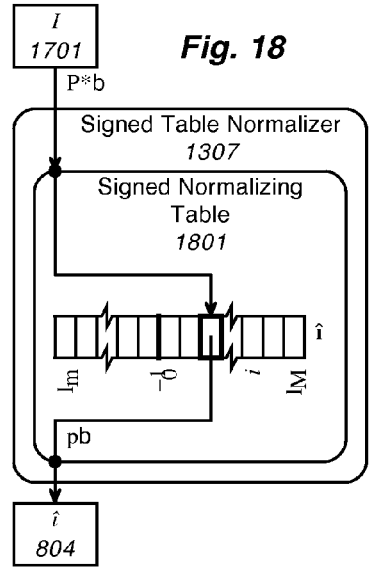
Figure 19:
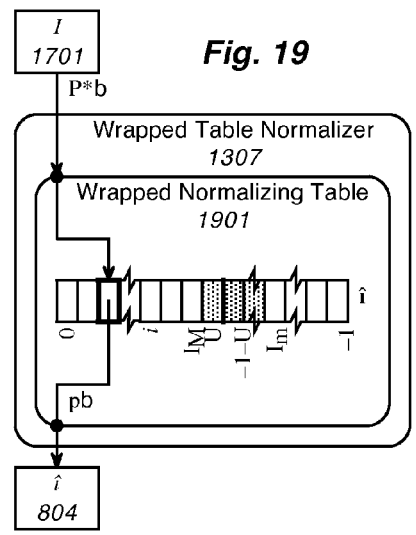

Custom embedded computers and certain other embodiments may favor table lookup over multiplication for the weighting step; and where it is possible to use coefficients that are plus or minus integral powers of two, left-shifting may be preferable. FIG. 15 illustrates a table-lookup implementation of a weighting element compatible with multiplying weighting elements 1404 in FIG. 14. Here unsigned p-bit image sample i 805 in the range [0 . . . u] indexes into weighted lookup table ixc 1501, outputting signed P+p-bit scaled sample ixc 1303. For signed image samples, offset indexing, as exemplified in FIG. 17, signed indexing as in FIG. 18, or wrapped indexing as in FIG. 19 can be used. Note that the contents of lookup table 1501 are specific to the kernel coefficient FIG. 16 depicts a shifting implementation of a weighting element compatible with multiplying weighting elements 1404 in FIG. 14, but suitable only for coefficients which are plus or minus an integral power of 2: $c = \pm 2^k$. Here p-bit image sample i 805 is left-shifted $k = \log_2(|c|)$ bits 1601 by integer shifter 1602, outputting unsigned P+p-bit scaled sample ixc 1303. For negative coefficients c<0, scaled sample ixc is then subtracted rather than added in combiner 1304. Again, for symmetrical kernels, for example $c_{0,-1} = c_{-1,0}$ for a 2 dimensional image, it is generally more efficient to first add the corresponding samples, e.g. $i_{0,-1}$, $i_{-1,0}$, with a p+1-bit adder and then scale that partial sum with a P+p+1-bit weighter before adding the weighted partial sum with the other weighted term(s). In a custom hardware implementation lacking a general-purpose multiplier, if the coefficient is not an integral power of 2 but is a sum of just a few integral powers of 2, a simplified custom multiplier combining just the appropriate shifted values is often the most efficient implementation. For example, a coefficient of c=5 can be implemented as $5 \times i = (i<<2) + i$.

Figure 17:
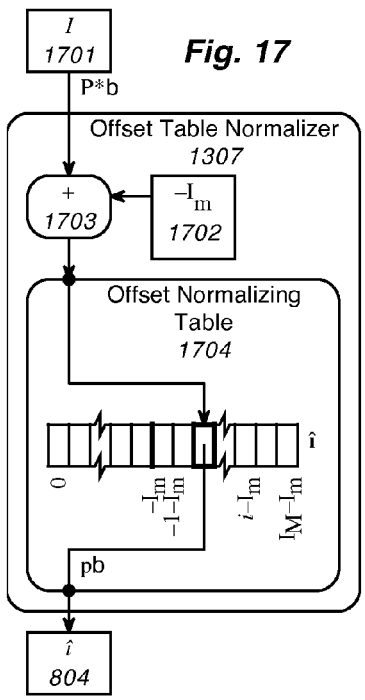
FIGS. 17, 18, 19, 20, and 21 are alternate information-flow diagrams of the normalizer in FIGS. 13 and 14.

For interchange of compressed images, the dividing normalizer 1307 depicted in FIG. 14 can be matched in a fairly straightforward manner with a table-lookup normalizer for custom embedded computers and other computation-bound platforms. Normalization by table lookup is facilitated by the use of small integer coefficients, which constrain the size of the normalization table. For example, choosing the P=3-bit coefficients $(c_{0,-1}, c_{-1,0}, c_{-1,-1})/C = (2,2,-1)/3$ to spatially filter progressive images with p=8 bits per unsigned sample ([0 . . . 255]) restricts the range of the combination to [−255 . . . 1020], requiring a normalization table of a mere 1276 entries of P*=11 bits, totaling less than 1.25 KB. The one hitch is that the optimal multidimensional kernels used in this invention have a negative coefficient at the corner sample, so that the range of the combination spans both signs. Perhaps the most obvious way to deal with signed indices is to offset the combination I by $-I_m = -\min(c_{y,x} \times i_{y,x}) = -\min(\min(c_{y,x}) \times \max(i_{y,x}), \max(c_{y,x}) \times \min(i_{y,x}))$ before indexing into the table. FIG. 17 illustrates an offset table-normalizing implementation compatible with the division-normalizing method in FIG. 14. Here combination I 1701 is added to offset $-I_m$ 1702 in two's-complement adder 1703, yielding an unsigned index, in the range [0 . . . $I_M - I_m$], into offset normalizing table î 1704, which is used by table lookup 1307 to translate the offset index into normalized prediction î 804. However, two's-complement signed indices can be handled with equal ease without any additional offset step, using one of two simpler methods. One alternative, the signed table lookup depicted in FIG. 18, accommodates signed two's-complement array indices $I \in [I_m \ldots I_M]$ 1801 by continuing the lookup table 1801 below index 0 from −1 down to $I_m$; this method is generally implementable at no additional cost on general-purpose processors, although some high-level programming languages disallow negative array indices. The other alternative, wrapped scale lookup, illustrated in FIG. 19, treats the relevant bits of signed combination I 1701—including the least-significant sign bit—as unsigned, and lets lookup table 1901 continue from the highest positive index $I_M$ on up to the highest representable two's-complement integer U of that precision, wrap around to the lowest representable two's- complement number of that precision −U−1, and proceed to the lowest negative index $I_m$ and on up to −1; this method is ideal for custom hardware implementations, where it is effected by routing only the relevant address lines, but it wastes the table space ($I_M \ldots I_m$), and it may require explicit masking I &−1−U in general-purpose processing environments.

Figure 20:
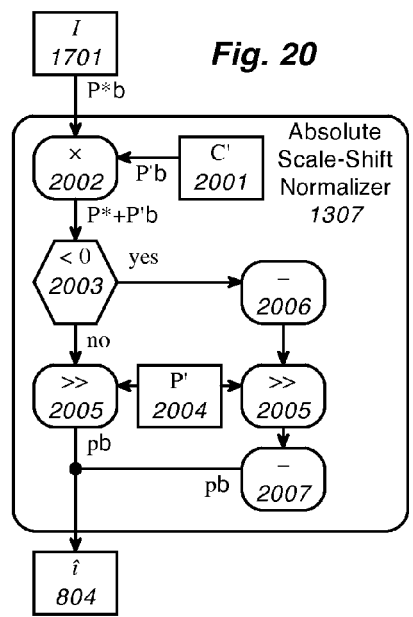
Figure 21:
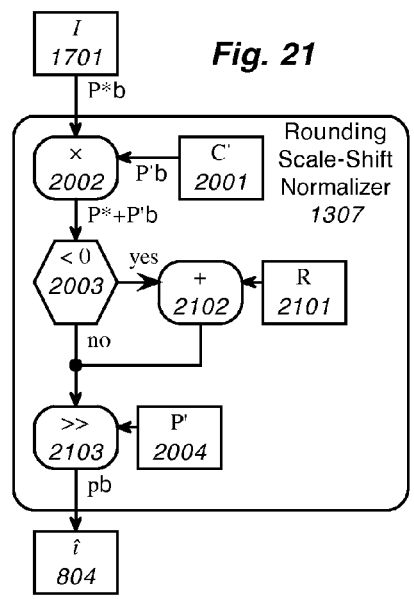
Figure 22:
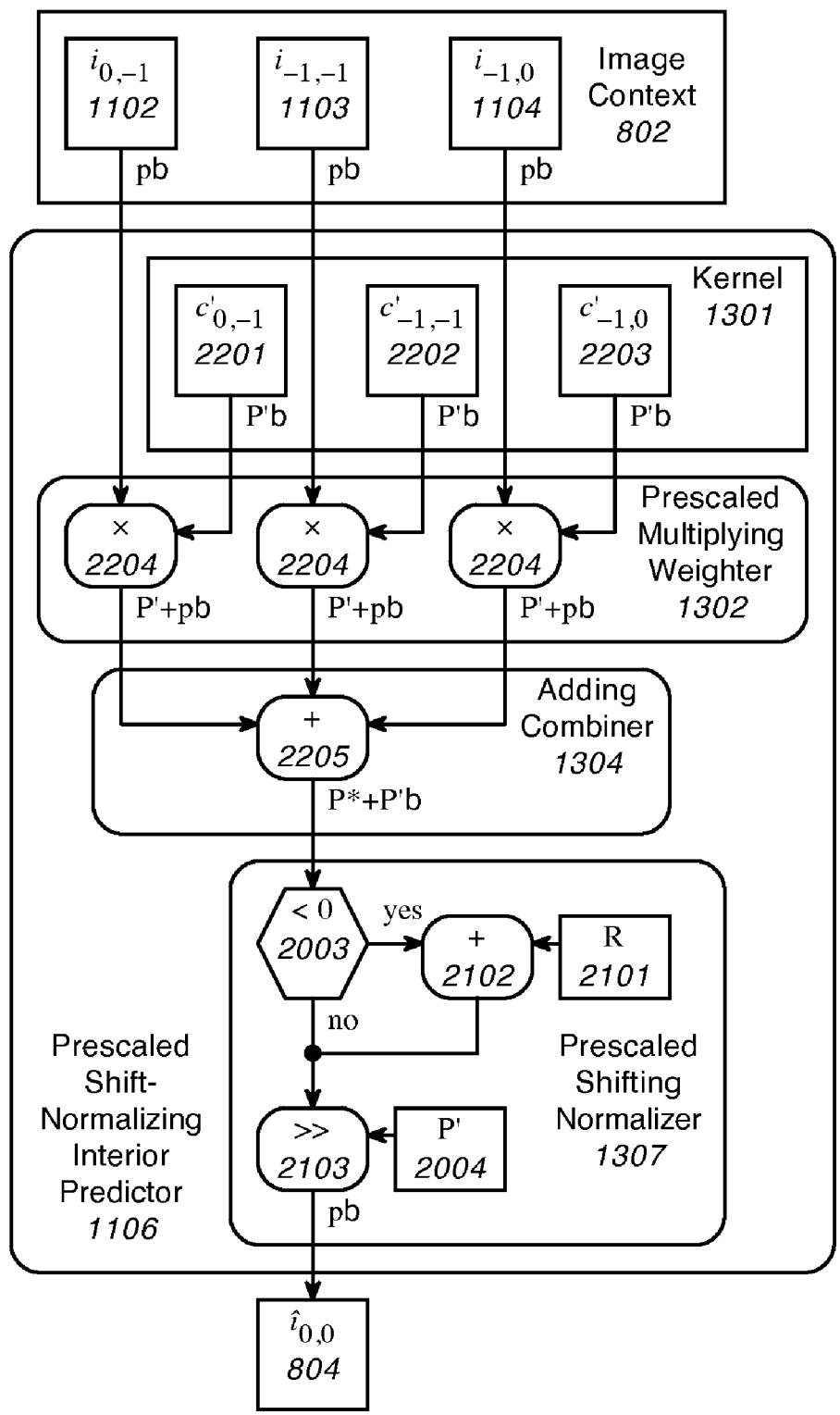

Matching the division-normalizing interior predictor with a shifting normalizer, for compressed-image interchange with signal processing computers and other memory-bound computing environments having fast multiplication but slow or no division, is a little trickier. Somewhat surprisingly, it is possible to simulate finite-precision unsigned integer division exactly using a combination of integer scaling and binary right-shifting: $n/d = n \times d' >> P'$, $d' = \lceil 2^{P'}/d \rceil$, where in general $P' = \lceil \log_2(n) \rceil + \lceil \log_2(d) \rceil$, though $P'$ can be less in specific cases. For example, for p=8-bit image samples and kernel $(c_{0,-1}, c_{-1,0}, c_{-1,-1})/C = (2,2,-1)/3$, $P' \geq \lceil 10 \rceil + \lceil 2 \rceil = 12$ bits, although in this case an 11-bit coefficient is sufficient, yielding 11-bit normalizing scale factor $C' = \lceil 2^{P'}/C \rceil = \lceil 2^{11}/3 \rceil = 683$. The hitch is that the optimal multidimensional kernels used in this invention have a negative coefficient at the corner sample, so that the range of the combination spans both signs. But whereas integer division truncates toward zero, two's-complement right-shifting truncates toward negative, so negative inputs to the normalizer must be treated specially to match the results of the division normalizer. This can done quite simply either by temporarily making the negative operand positive, or by adjusting the negative value to ensure proper rounding behavior. FIG. 20 illustrates an absolute scale-shift-normalizing implementation, $i/C \equiv \{-(-i \times C' >> P')|i<0; i \times C' >> P'|i \geq 0\}$, compatible with the division-normalizing 1407 method in FIG. 14. Here combination I 1701 is first multiplied by normalizing scale factor $C' = \lceil 2^{P'}/C \rceil$ 2001 using P*+P'-bit integer multiplier 2002. The result is then compared to zero by sign tester 2003. If nonnegative, the scaled combination is right-shifted P' bits 2004 by unsigned integer right-shifter 2005, yielding prediction î 804. If negative, the scaled combination is first made positive by P*+P'-bit sign changer 2006, then scaled and shifted as for the nonnegative case, then negated again by p-bit sign changer 2007. FIG. 21 depicts an alternative rounding scale-shift implementation, $i/C \equiv \{(i \times C' + R >> P')|i<0; i \times C' >> P'|i \geq 0\}$, where $R = (1 << P')-1$. Here combination I 1701 is multiplied by normalizing scale factor $C' = \lceil 2^{P'}/C \rceil$ 2001 using P*+P'-bit integer multiplier 2002, and the result is compared to zero by sign tester 2003. If negative, the result is adjusted by R 2101 using two's-complement adder 2102 to round it upwards in the upcoming shifter. The possibly adjusted result is then right-shifted P' 2004 bits by signed two's-complement shifter 2103, yielding prediction î 804. In the shift-normalizing case just as in the table-normalizing case, for coefficients which are plus or minus integral powers of two, left-shifting is generally preferable to multiplication for the weighting step except in SIMD vector-processing environments. On the other hand, in cases where the requisite intermediate-value precision is not problematic and the weighter is implemented exclusively by multiplication—as in a SIMD processor or when no coefficients are plus or minus powers of two—then the scaling step for shift normalization can be incorporated into the weighter. FIG. 22 illustrates such a prescaled shift-normalized interior predictor $$\hat{i}_{0,0} = (i_{0,-1} \times c'_{0,-1} + i_{-1,0} \times c'_{-1,0} + i_{-1,-1} \times c'_{-1,-1}) >> P'$$

Here p-bit spatial context samples $i_{0,-1}$ 1102, $i_{-1,-1}$ 1103, and $i_{-1,0}$ 1104, are multiplied by P-bit prescaled integer kernel coefficients $c'_{0,-1} = c_{0,-1} \times C'$ 2201, $c'_{-1,-1} = c_{-1,-1} \times C'$ 2202, and $c'_{-1,0} = c_{-1,0} \times C'$ 2203, respectively, using p+P'-bit two's-complement integer multiplies 2204, where $C' = \lceil 2^{P'}/C \rceil$, and $P' = \lceil \log_2(\max(c_{y,x})) \rceil + \lceil \log_2(C) \rceil$. The results of these multiplies are accumulated by P*+P'-bit two's-complement integer adder 2205, and normalized by prescaled shifting normalizer 1307, which adds rounding constant R 2101 with integer adder 2102 if negative, and right-shifts the prescaled sum by P' bits 2004 using integer shifter 2103. In place of adding a rounding constant to negative sums, one can change the sign before and after the right shift using sign-changers 2006 and 2007, respectively, as in FIG. 20.

In workflows dominated by the nowadays common case of general-purpose computers having variable instruction times with faster multiplication than division and even faster shifting, and having multi-level caches in which table lookup is also relatively slow, the most appropriate reference implementation of the interior predictor uses a symmetrical kernel whose norm is a power of 2, with multiplication or where possible shifting in the weighter, addition and subtraction as appropriate in the combiner, and shifting for normalization.

$$\hat{i}_{0,0} = ((i_{0,-1} + i_{-1,0}) \times c_0 - i_{-1,-1} \times c_1) >> P$$

Figure 23:
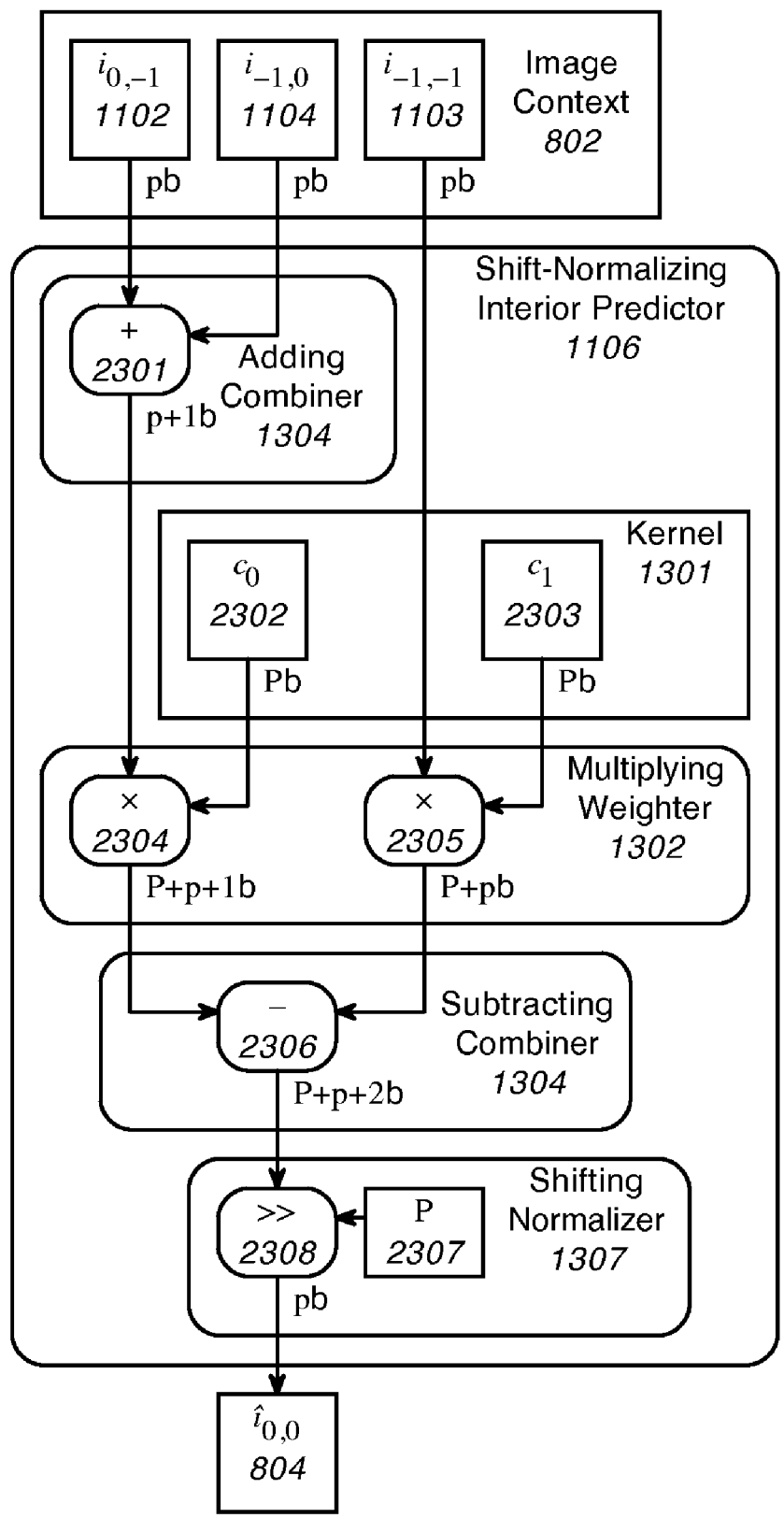

This method generally yields slightly lower compression power than the division-normalizing implementation of FIG. 14, partly because real-world digital photographic imagery has a horizontal statistical bias, partly because division is slightly more accurate for negative numbers, and sometimes in part because the optimal kernel plateau, though broad, is not perfectly level, and may be slightly higher at points whose norm is not a power of two. FIG. 23 depicts a shift-normalizing implementation for the interior predictor of a 2-dimensional image. Note that this implementation maintains relatively low precision throughout, in contrast to the shift-normalizing implementation depicted in FIG. 22 designed to match the dividing normalizer. In FIG. 23, symmetrically placed p-bit spatial context samples $i_{0,-1}$ 1102 and $i_{-1,0}$ 1104 are first added by p+1-bit adder 2301, and then multiplied by kernel coefficient $c_0 = c_{0,-1} = c_{-1,0}$ 2302 using P+p+1-bit integer multiplier 2304, whereas sample $i_{-1,-1}$ 1103 is multiplied alone by unsigned kernel coefficient $c_1 = |c_{-1,-1}|$ 2303 using P+p-bit multiplier 2305. If the image samples are unsigned, then adder 2301, kernel coefficients 2302 and 2303, and multipliers 2304 and 2305 can all be unsigned as well. The weighted term $i_{-1,-1} \times c_1$ output by weighting element 2305 is then subtracted from weighted partial combination $(i_{0,-1} + i_{-1,0}) \times c_0$ output by weighting element 2304 using two's complement subtractor 2306, yielding P+p+2-bit combination I, which in turn is right-shifted P bits 2307 by two's-complement shifter 2308 to produce p-bit estimate $\hat{i}_{0,0}$ 804. Depending on the relative cost of negative operands in multiplication versus addition, it may be preferable to use a negative coefficient for $c_1$ 2303 and add instead of subtracting in combiner 2306.

Normalizing by right-shift is universally so cheap that it is hard to imagine a reason to try to emulate it with a division normalizer, although this is technically possible by treating the negative inputs specially. Likewise, it is hard to imagine wanting to emulate it with table lookup, although that would be completely straightforward. In fact, in custom embedded environments that would compel the use of table-lookup normalization to match a reference division normalizer, shift-normalization can be matched without any explicit shifting merely by routing the retained result bits appropriately and ignoring the bits that would be shifted out.

Figure 24:
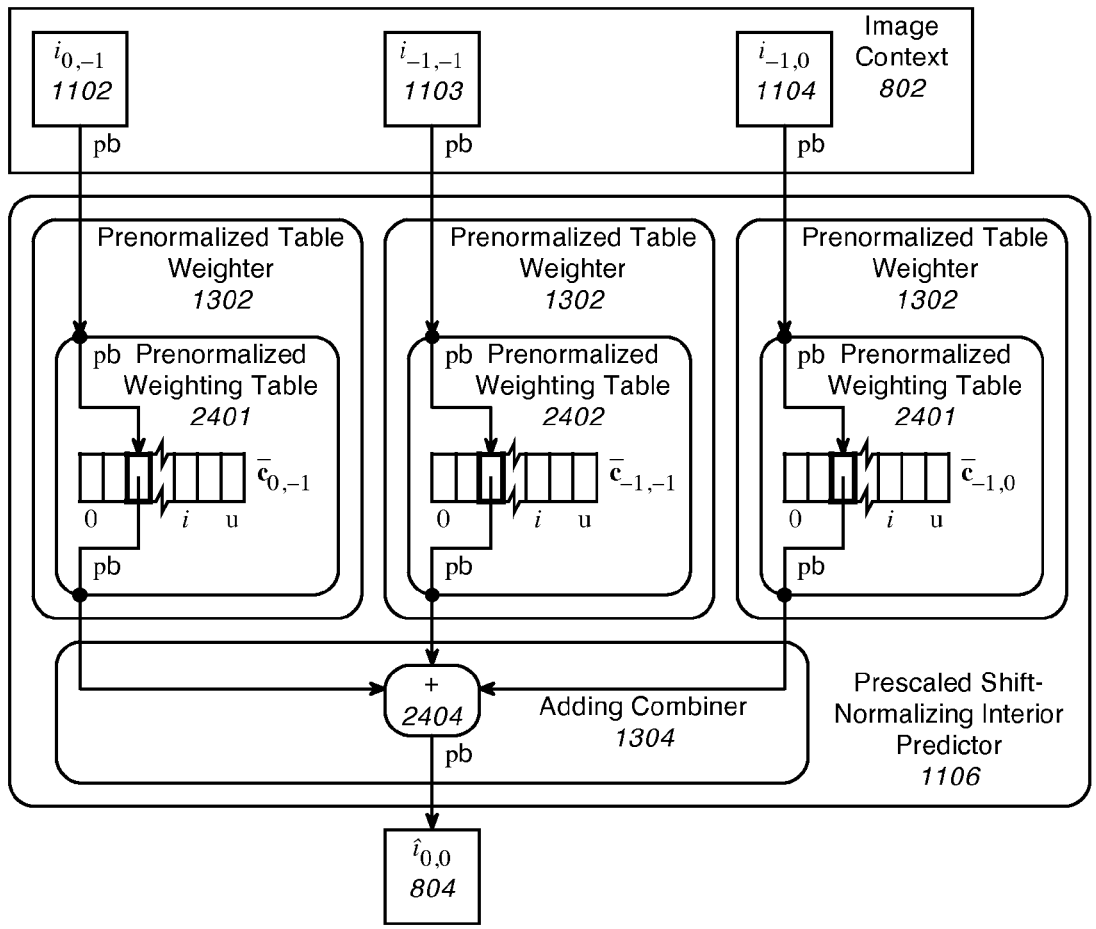

In workflows dominated by compute-bound platforms where division and multiplication are both too costly, such as for low-power or featherweight custom embedded solutions, the optimal implementation uses lookup tables or (where coefficients permit) left-shifts for the weighter, and addition and subtraction as appropriate for the combiner. If data precision is at a premium, the lookup tables can be prenormalized to the same precision as the input samples, so that no explicit normalization step is required, and the same minimal precision is maintained throughout, albeit at a significant cost in compressive power. FIG. 24 illustrates a prenormalized lookup-table implementation of the interior predictor for a 2-dimensional image.

$$\hat{i}_{0,0} = {}^-c_{0,-1}[i_{0,-1}] + {}^-c_{-1,0}[i_{-1,0}] + {}^-c_{-1,-1}[i_{-1,-1}]$$

Figure 25:
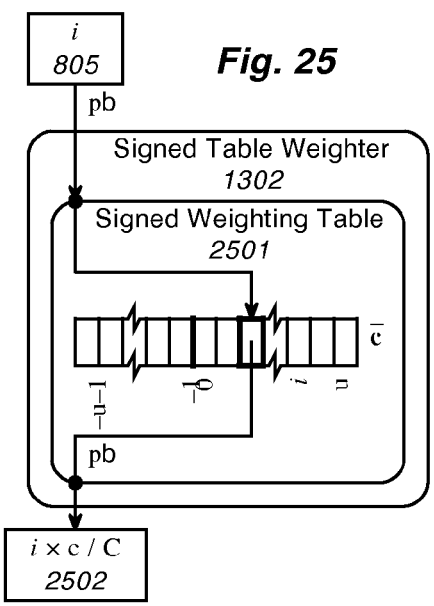
FIGS. 25 and 26 are alternate information-flow diagrams of the weighting table in FIG. 24.
Figure 26:
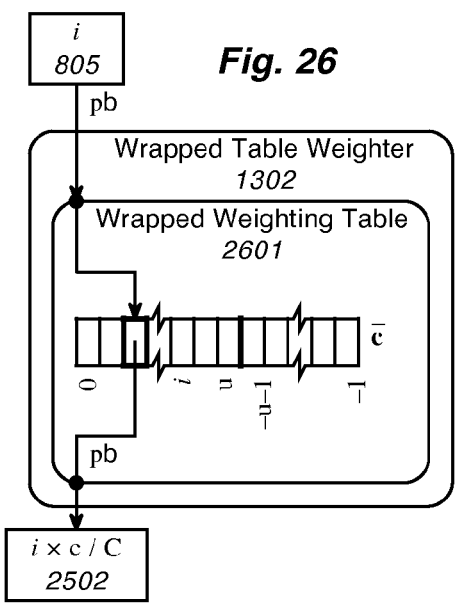

Here multiplication is effected by having prenormalized weighting table lookups 1302 use p-bit spatial context samples $i_{0,-1}$ 1102, $i_{-1,-1}$ 1103, and $i_{-1,0}$ 1104 as indices into p-bit prenormalized scaling tables ${}^-c_{0,-1}$ 2401, ${}^-c_{-1,-1}$ 2402, and ${}^-c_{-1,0}$ 2403, respectively, where ${}^-c_{y,x} = \{i \times c_{y,x} >> P\}$, i is an index ranging over the set of possible image sample values, {•} denotes the table contents, and [•] denotes table access. In principle, the tables could be filled with division-normalized values, but ordinarily shift-normalized values are preferable for compatibility with other platforms for which division normalization would be too costly. The results of these table lookups are accumulated by p-bit two's-complement integer adder 2404 to yield spatial prediction $\hat{i}_{0,0}$ 804. Although the example in FIG. 24 shows unsigned image context samples ranging over i=[0 . . . u], two's-complement signed values can be handled with equal ease without adding an offset to the index, using one of two simpler methods. One alternative, the signed weighting table depicted in FIG. 25, accommodates negative two's-complement array indices $i \in [-u-1 \ldots u]$ 805 and continues the lookup table 2501 below index 0 from −1 down to −u−1; this method is generally implementable at no additional cost on general-purpose processors. The other alternative, the wrapped weighting table illustrated in FIG. 26, treats the relevant bits of signed image sample i 805—including the least-significant sign bit—as unsigned, and lets lookup table 2601 wrap around from the highest positive index u to the lowest negative index −u−1 and on up to −1; this method is ideal for custom hardware implementations, where it is effected by routing only the relevant address lines, but it may require explicit masking in general-purpose processing environments.

Figure 27:
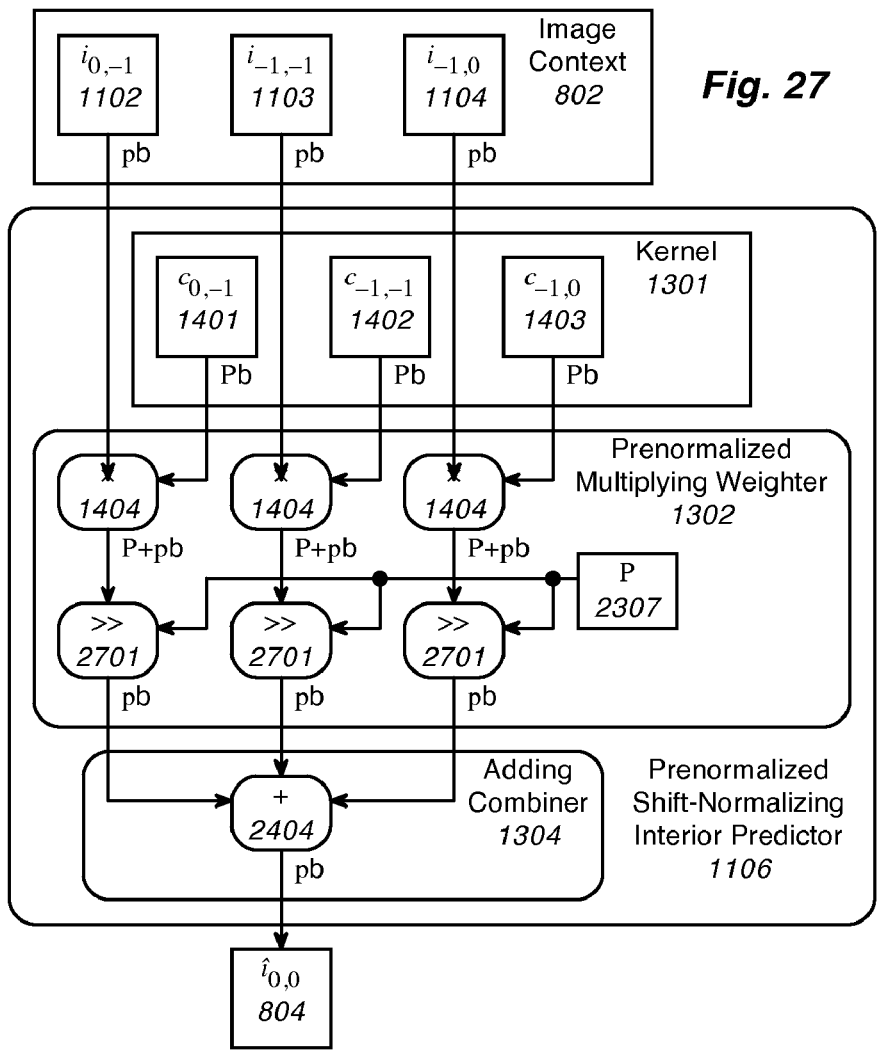

The prenormalized implementation of FIG. 24 can be matched exactly in a memory-bound computing environment by shifting the terms before combining them. FIG. 27 depicts such a prenormalized shift-normalizing interior predictor $$\hat{i}_{0,0} = (i_{0,-1} \times c_{0,-1} >> P) + (i_{-1,0} \times c_{-1,0} >> P) + (i_{-1,-1} \times c_{-1,-1} >> P)$$

Here p-bit spatial context samples $i_{0,-1}$ 1102, $i_{-1,-1}$ 1103, and $i_{-1,0}$ 1104, are multiplied by P-bit integer kernel coefficients $c_{0,-1}$ 1401, $c_{-1,-1}$ 1402, and $c_{-1,0}$ 1403, respectively, using p+P-bit two's-complement integer multiplies 1404. The results of these multiplies are individually normalized by right-shifting P bits 2307 using P+p-bit two's-complement shifters 2701, and then combined with p-bit two's-complement adder 2404.

Figure 28:
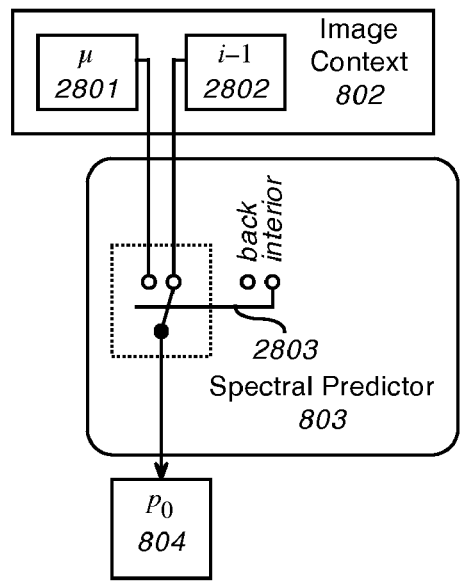
FIG. 28 is an information-flow diagram of the predictor in FIGS. 8 and 9 for a spectral filter.

The spectral predictor used in the present invention is simply equal to the previous spectral component. At the initial boundary, i.e. for the first spectral component and for uncorrelated channels, the spectral predictor is equal to the theoretical or empirical ensemble mean. FIG. 28 shows a two-position switch, 2803, that switches the input to ensemble mean μ 2801 for the back spectral component and uncorrelated channels, and to previous spectral component $i_{-1}$ 2802 elsewhere, yielding spectral prediction $p_0$ 804.

Differencing

The differencer comparing the predicted and actual sample values may be applied either symmetrically or asymmetrically, yielding difference signals of opposite signs. In a symmetrical implementation, the target is subtracted from the prediction in both compression and decompression, permitting the same differencer to be used in both directions.

$$d = p - i$$

$$i = p - d$$

FIG. 29 shows the connections for a symmetrically applied differencer. In the compression phase, actual image sample i 805 is subtracted from predicted sample p 804 by subtractor 2901 to yield difference d 807. In the decompression phase, difference d 807 is subtracted from predicted sample p 804 by subtractor 2901 to yield reconstructed image sample i 805.

In an asymmetrical implementation, the prediction is subtracted from the target in one direction and added in the opposite direction. Since addition is generally easier to implement than subtraction, the asymmetrical method may be advantageous where speed or cost is more important in one direction than the other.

$$d = i - p$$

$$i = d + p$$

FIG. 30 shows the connections for an asymmetrically applied differencer. In the compression phase, predicted sample p 804 is subtracted from actual image sample i 805 by subtractor 2901 to yield difference d 807. In the decompression phase, predicted sample p 804 is added to difference d 807 by adder 3001 to yield reconstructed image sample i 805.

Deprecision

Although the image sample has a precision of p bits, the spatial predictor in general yields a P+p-bit value. The spatial differencer adds another bit of precision, as do the spectral and temporal differencers. Somewhat surprisingly, the high-order bits, while crucial to the accuracy of the filtered result, yield modular equivalence classes from the point of view of reversibility, for which only the low-order p bits of integer information need be retained. Recall that fractional bits are already discarded by the normalizer. Thus the deprecider reduces the precision back down to p bits. Three alternative methods of deprecision are saturation, mirroring, and wrapping.

Saturation, available in some special-purpose processors, limits values outside the desired range to the nearest extremum. That is, it sets any value below the minimum to the minimum, and any value above the maximum to the maximum. FIG. 31 depicts an unsigned saturator, in which input d 807 is saturated by saturator 3102 to the range [0 . . . u] specified by base $b = 2^p = u + 1$ 3101, yielding saturated output r 809. In the absence of special hardware support, saturation generally requires a pair of tests and branches, making it a poor choice for real-time applications. However, it does generally yield better compressive power than wrapping. Mirroring (not depicted), in which out-of-range values are reflected back inside the nearest extremum, iteratively when necessary, is theoretically superior to wrapping, but requires far too much processing for real-time applications. Both saturation and mirroring need to be applied before differencing. The extra bit added by differencing can only be removed by wrapping.

Wrapping, in which out-of-range values are wrapped around through the opposite extremum as if all values were connected in a circle with minimum succeeding maximum, is commonly available by taking the remainder modulo b. Note that off-the-shelf implementations of the modulo operator typically yield incorrect outputs for negative inputs. FIG. 32 illustrates a general wrapping depreciator, where input d 807 is wrapped by modulo operator 3202 to the unsigned range [0 . . . u] or signed range [−u . . . u] specified by base b=u+1 3201, yielding wrapped output r 809. In general, the modulo operator involves division or iterative subtraction, which is far too slow for real-time applications. In the preferred embodiment, this problem is avoided by choosing b to be an integral power of 2, and using the 'and' mask operator with two's-complement arithmetic instead of the slower modulus operator. FIG. 33 depicts a masking depreciator, where input d 807 is wrapped by mask operator 3302 to the range [0 . . . u] specified by mask m=u=$2^p$−1 3301, yielding wrapped output r 809.

Deprecision is only necessary after the last (de-)filter stage, and even then only need only be explicit if the data path is wider than the required precision p. If the data path precision is p, then the mere process of outputting the low-order p bits of the result through this constricted path is equal in effect to masking it. However, deprecision may be applied as desired after prediction or differencing at any stage in order to reduce the computational precision required for further processing, at only a slight cost in compressive power. If any intermediate results are deprecated in the compressor, exactly the same deprecision must be applied at the corresponding point in the decompressor, and vice versa.

Encoding/Decoding

Figure 34:
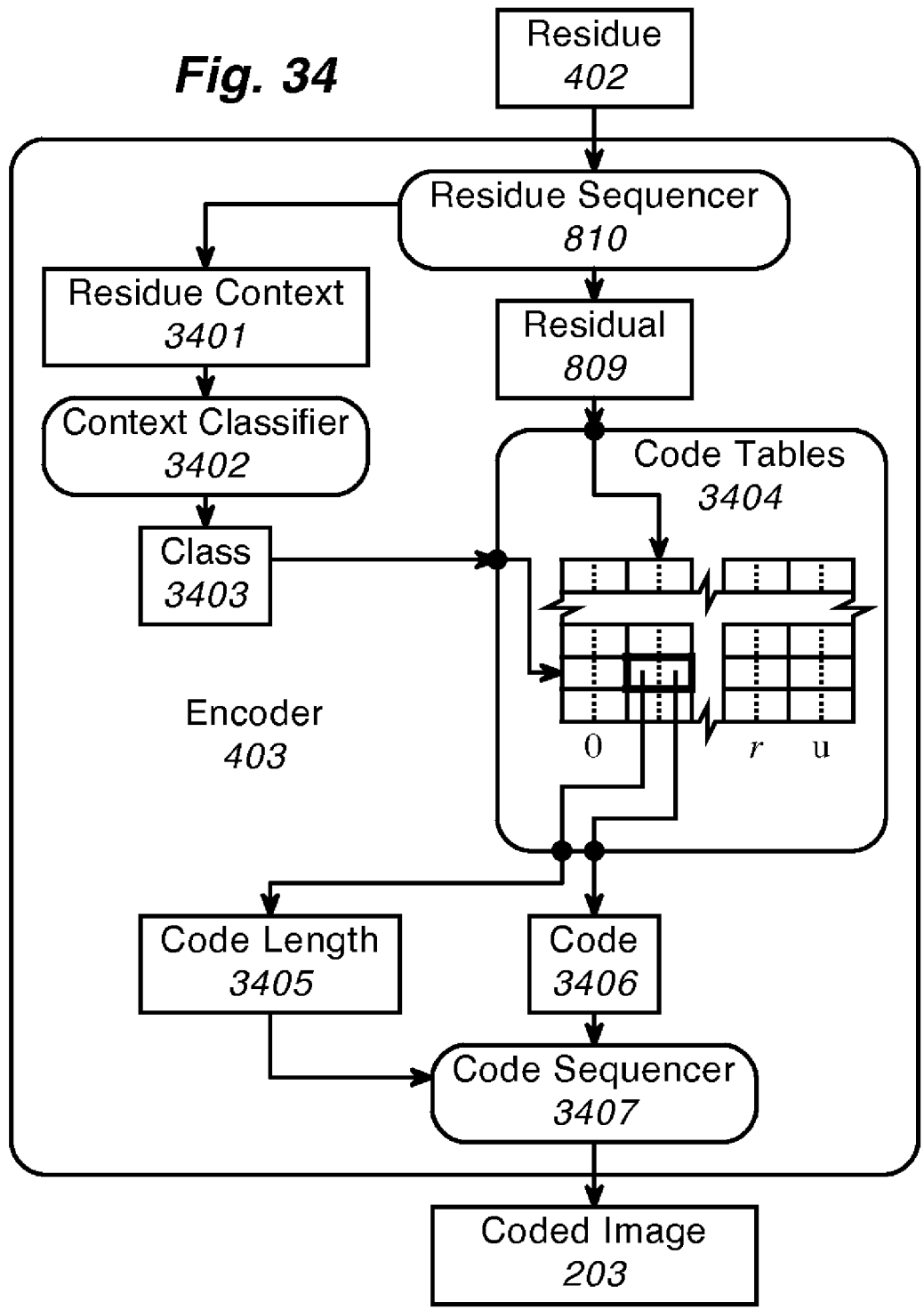
FIG. 34 is an information-flow diagram of the encoder in FIG. 4.

The residue output by the condensing filter can be encoded with any standard entropy coder, including a binary prefix coder such as a Huffman tree, a string coder such as a Ziv-Lempel coder, or an arithmetic coder, and the entropy coder can be adaptive or fixed. For bidirectional speed and applicability to photoquality images, the preferred embodiment of the present invention uses fixed prefix codes. The length of each prefix code is roughly inversely proportional to its probability, as in Huffman and similar prefix codes. In the preferred embodiment of this invention, the encoder offers different modes with different trade-offs between speed and compressive power. In the fastest and simplest mode, the code tables are context-independent. For greater power, at the cost of a reduction in speed, the code tables are based on the temporal, multidimensional spatial, and spectral adjacent causal residue samples, where contexts with similar probability distributions are incoherently collapsed into a small number of classes by a context reducer using one-dimensional lookup tables followed by implicitly multidimensional lookup tables, to minimize the overall table size. FIG. 34 illustrates the information flow for the encoder. For each temporospatiospectral location in the image, residue sequencer 810 fetches appropriate residual 809 and residue context 3401 from residue image 402. Context classifier 3402 determines the optimal code table for residue context 3401, outputting class 3403. Class 3403 and residual 809 index into code tables 3404, yielding code length 3405 and code 3406. Code sequencer 3407 outputs the number of bits specified by code length 3405 from code 3406 to the appropriate location in coded image 203. On a sequential processor, residue 402 may be fed in directly from the last filter stage in scan order, obviating the need for explicit input sequencing.

Figure 35:
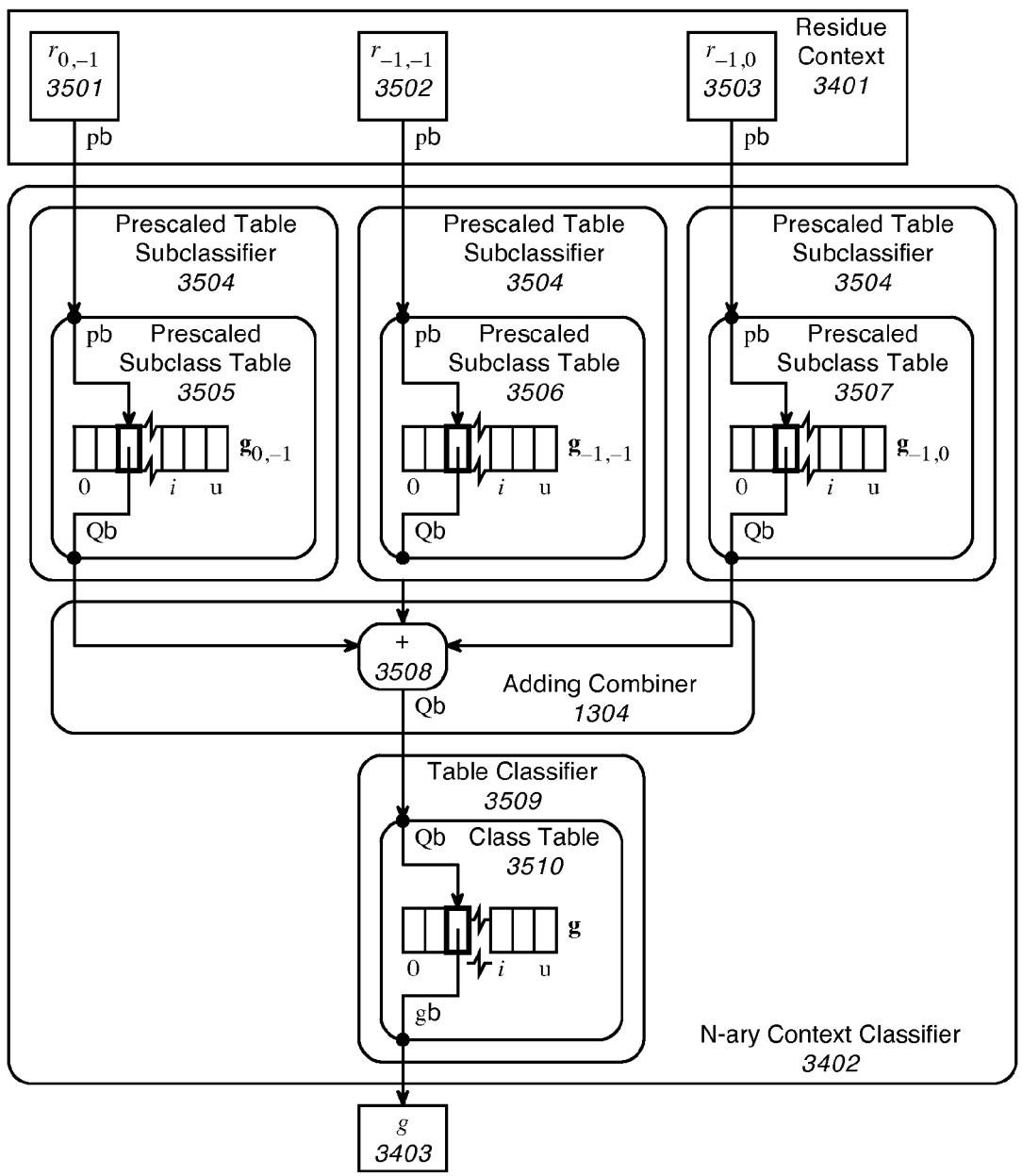
FIGS. 35 and 36 are alternate information-flow diagrams of the context classifier in FIG. 34.
Figure 36:
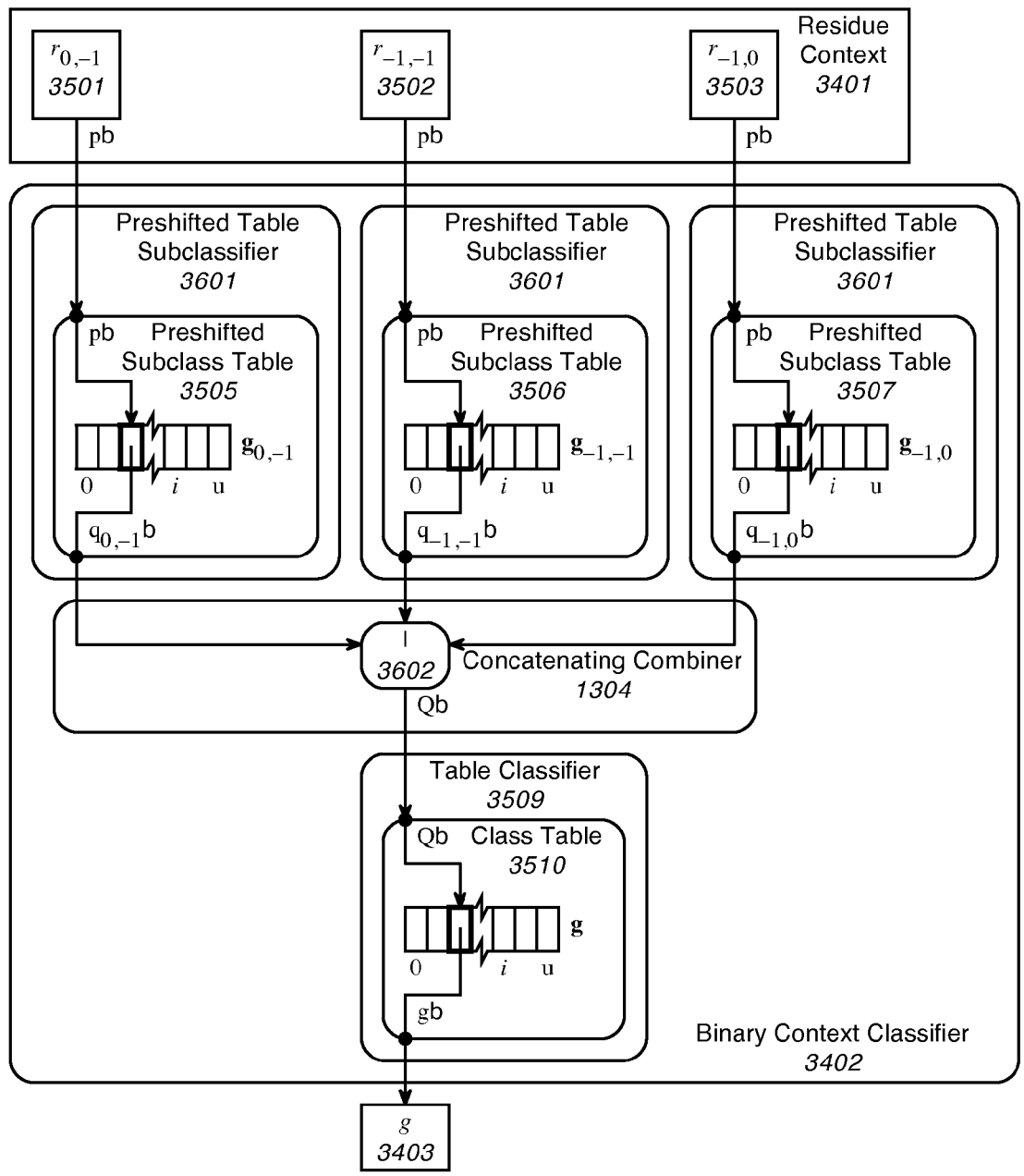

FIG. 35 depicts the information flow for a context classifier for a two-dimensional spatial context. Here spatial residue context 3401 consisting of p-bit residue samples $r_{0,-1}$ 3501, $r_{-1,-1}$ 3502, and $r_{-1,0}$ 3502 is used by table lookups 3504 to index into prescaled subclass tables $g_{0,-1}$ 3505, $g_{-1,-1}$ 3506, and $g_{-1,0}$ 3507, respectively, generating Q-bit prescaled subclass numbers, which are then combined by Q-bit adding combiner 3508 into a single p-bit value which is used in turn by p-bit table lookup 3509 as an index into class table g 3510 to yield the final g-bit class number g 3403. Subclass tables 3505 . . . 3507 and class table 3510 are chosen to statistically maximize the compression power of the encoder for representative image data while minimizing the number of subclasses and classes. Prescaling the n-ary subclasses permits combiner 1304 to maintain orthogonality with simple addition, rather than first multiplying each by the respective subtotal before adding it in. For the benefit of computing environments where concatenation or 'or'-ing of bits is cheaper than addition, such as in custom embedded environments, choosing the subclass counts to be integral powers of 2 permits subclass combiner 1304 to avoid addition. FIG. 36 illustrates such a binary context classifier. Here preshifted table lookups 3601 output $q_{0,-1}$, $q_{-1,-1}$, and $q_{-1,0}$ bits, respectively, for spatial residue context samples $r_{0,-1}$ 3501, $r_{-1,-1}$ 3502, and $r_{-1,0}$ 3503, which are then concatenated by concatenating combiner 3602 to yield the Q-bit class index. In custom hardware, the concatenation is preferably implemented by routing the subclass bits to the appropriate bits of the class index, so the preshifting takes place on output rather than in the table entries. In a general-purpose computing environment lacking simple bit-field concatenation facilities, concatenating combiner 3602 uses a bitwise logical disjunction ('or') operator. In the example illustrated, for progressively scanned 8 bit unsigned R'G'B' images, good choices are $q_{0,-1}=q_{-1,0}=3$ for 8 subclasses each for $g_{0,-1}$ and $g_{-1,0}$, $q_{-1,-1}=2$ for 4 subclasses for $g_{-1,-1}$, totaling Q=8 bits for 256 Cartesian-product subclasses, and g=4 for 16 classes for g. Increasing the subclass and class counts can increase the compression power at the cost of higher-precision data paths, larger class tables, more code tables, and a much larger set of training data or more-sophisticated statistical analysis. Although for simplicity of illustration FIG. 35 and FIG. 36 show only a 2-dimensional spatial residue context, the residue context generally also includes, where appropriate, spectral, temporal, and higher-dimensional spatial residue samples. In the fastest mode, however, the encoder is independent of the residue sample values, and the class depends only on the channel, where residue channels with similar distribution share code tables to conserve table space. For spectrally filtered samples, for example, the first channel, having a quite different residue distribution due to the absence of a local predictor, benefits especially from having a specific code table, while subsequent filtered spectral channels generally have similar distributions. Likewise, the two chroma channels $C_B$, $C_R$ in $Y'C_BC_R$ images typically have similar distributions, quite different from the luma channel.

In prior art, prefix coding is quite slow in the decoding phase, proceeding one bit at a time. However, the present invention uses novel chunked lookup tables to make prefix decoding as fast or nearly as fast as prefix encoding. For a decoder, the chief problem with prefix codes is that they vary in length, making direct lookup difficult. A chunked decode table is a novel technique for treating prefix codes as if they were all the same length, even though some are shorter and others are longer. Thus, for each possible bit sequence of a given chunk length, if that bit sequence corresponds to a code of that length or begins with a code of a shorter length, the table entry for that bit sequence lists the actual decode length and the decoded residual, regardless of the remaining bits in the chunk. In other words, the table entries for all bit sequences beginning with a too-short code list the decode length and decode of that too short code. If, on the other hand, the bit sequence corresponds to the beginning of a code longer than the chunk length, then the table entry for that bit sequence lists a subdecode table index instead of a decode length, along with the partial residual. In the same way, the subdecode table can if necessary point to subdecode tables, and so forth. The chunk size can in principle be chosen to be large enough to include the longest code to guarantee one-step lookup, which may speed up decoding at a large cost in data memory. In the preferred embodiment, the chunk size is chosen to be one or more bytes for efficient use of storage. Storing partial decodes instead of complete residuals in the subdecode tables permits portions of the subtables to be collapsed for a further savings in data memory; in this case, when a code consists of more than one chunk, the partial decodes are summed to produce the reconstituted residual. The present invention introduces the novel procedure of adjusting the codes to have a maximum length equal to a small integral number of chunks in order to minimize the number of decoding steps and the data table size and hence maximize the speed, at a slight cost in compressive power due to the alteration of implicit class probabilities. For 10-bit channels, for example, the preferred embodiment for the constraints of current general-purpose processors limits the code length to 16 bits in the interest of maximizing decoding speed, even though permitting longer codes could significantly increase the compressive power.

Figure 37:
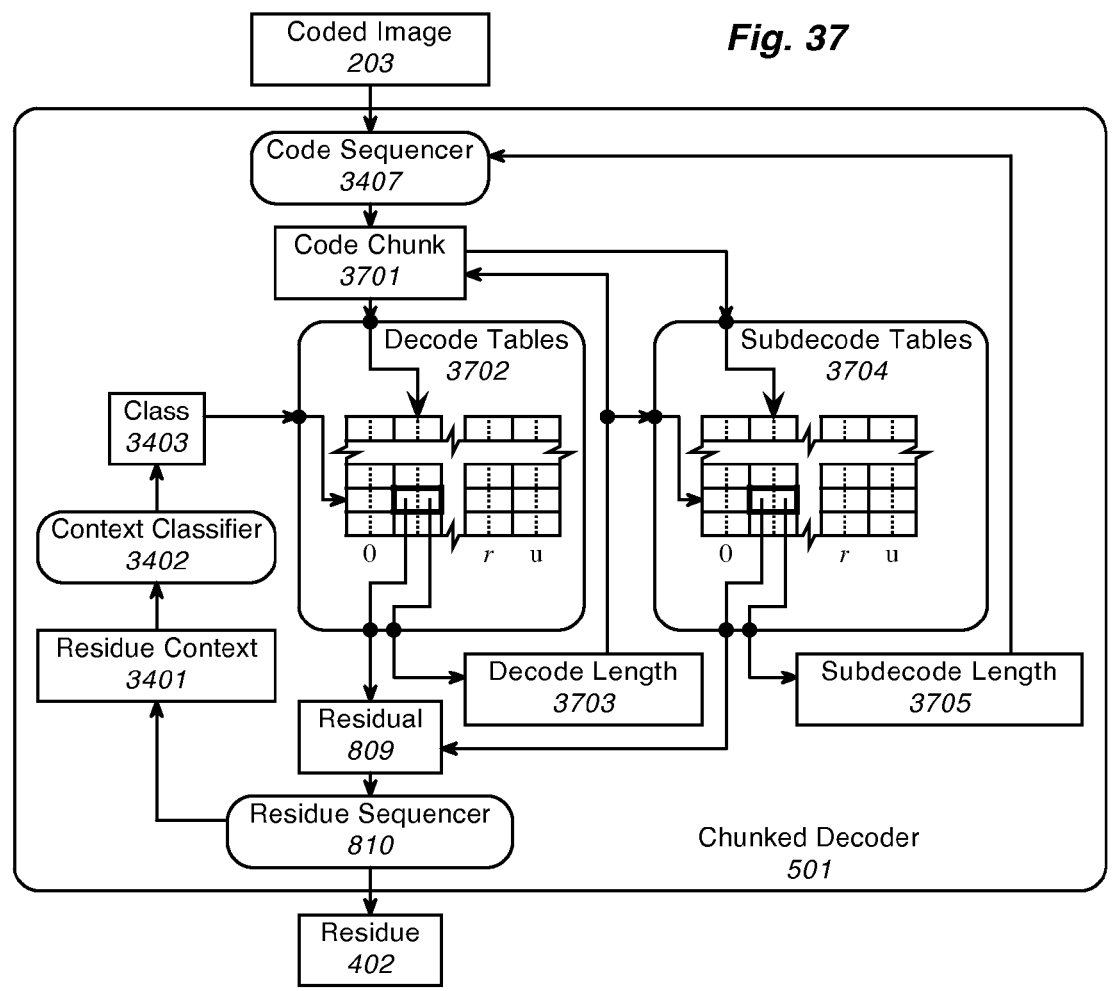
FIG. 37 is an information-flow diagram of the decoder in FIG. 5.

FIG. 37 depicts the information flow for the chunked decoder for a two-level table. Code sequencer 3407 outputs code chunk 3701 from coded image 203. Class 3406 and code chunk 3701 index into chunked decode tables 3702, yielding decode length 3703 and residual 809. Decode length 3703 tells code sequencer 3407 how far to advance to the beginning of the next chunk. If the decode length is shorter than the chunk length, then the next chunk overlaps this one. If the decode length is longer than the chunk length, then decode length 3703 and the next code chunk 3701 index into subdecode tables 3704 to yield subdecode length 3705 and (partial) residual 809. Residue sequencer 801 then outputs residual 809 to the appropriate location in residue image 402. Residue sequencer also outputs residue context 3401 to context classifier 3402, which generates class 3403 corresponding to the residue context.

Implementation Examples

Figure 38:
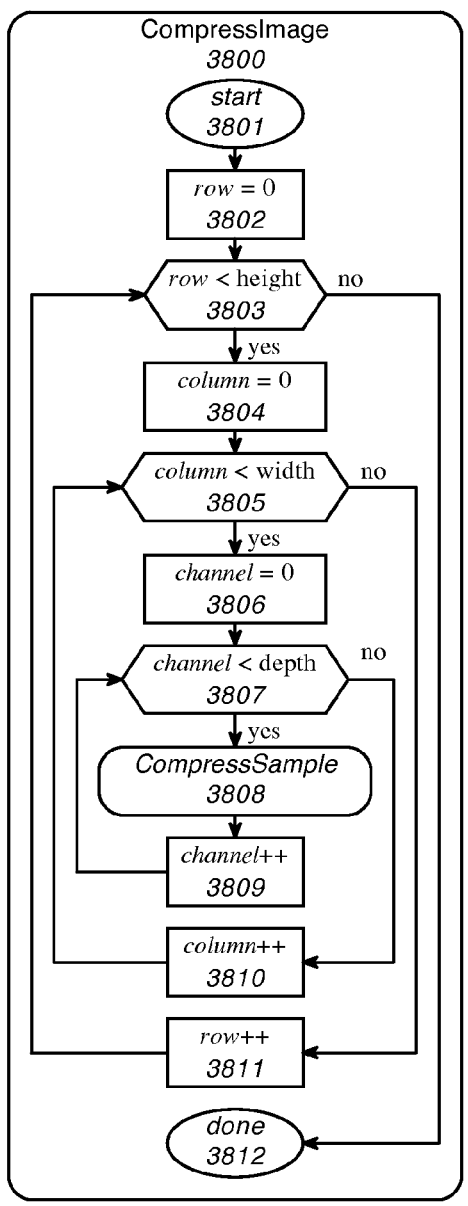
FIG. 38 is a compact process-flow diagram of the compressor for a 2-dimensional color image.
Figure 39:
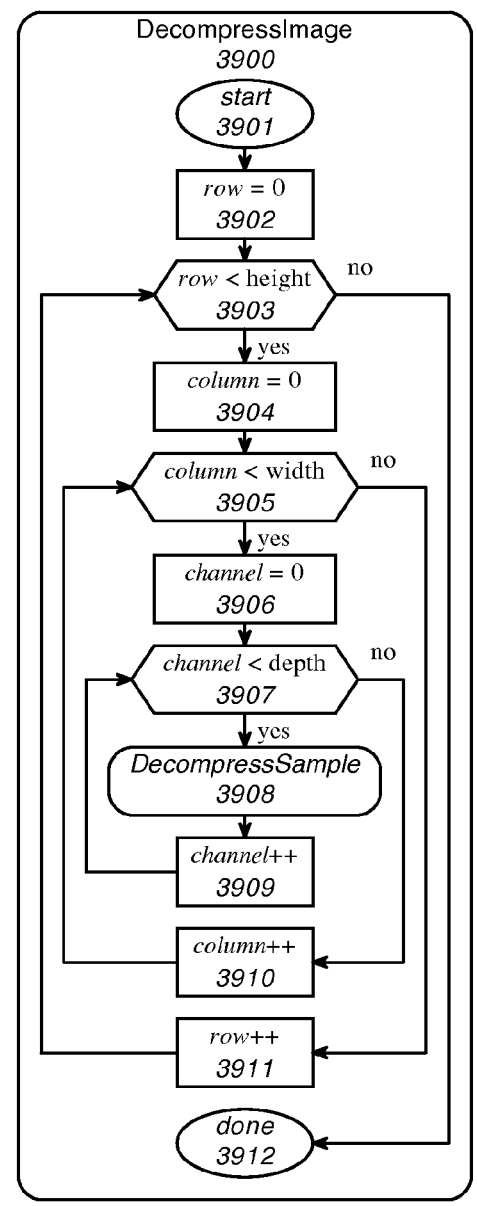
FIG. 39 is a compact process-flow diagram of the decompressor for a 2-dimensional color image.

FIG. 38 and FIG. 39 show the process flow for a compact, simple fast-mode implementation of the image compressor and decompressor tailored for two-dimensional color images and designed to run on a sequential processor. For illustration purposes, the diagrams use C-like pseudocode. The CompressImage procedure in FIG. 38 executes a three-level nested loop, processing the sample in every channel in every column in every row, at the center of which the current sample is compressed by procedure CompressSample 3808. The DecompressImage procedure in FIG. 39 executes an identical three-level loop to decompress every sample in procedure 3908.

Figure 40:
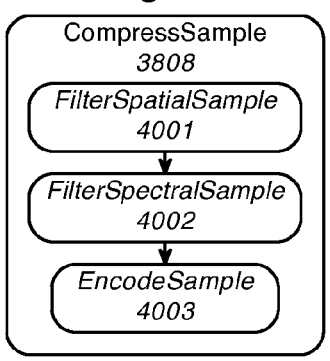
FIG. 40 is a process-flow diagram of the compress-sample step in FIG. 38.
Figure 41:
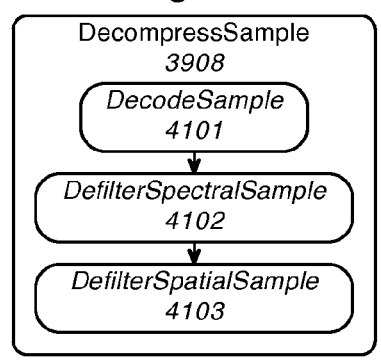
FIG. 41 is a process-flow diagram of the decompress-sample step in FIG. 39.

FIG. 40 reveals the CompressSample procedure 3808 to consist of three sequential subprocedures: FilterSpatialSample 4001, FilterSpectralSample 4002, and EncodeSample 4003. FIG. 41 reveals the DecompressSample procedure 3908 to consist of the opposite three subprocedures in the opposite order DecodeSample 4101, DefilterSpectralSample 4102, and DefilterSpatialSample 4103.

Figure 42:
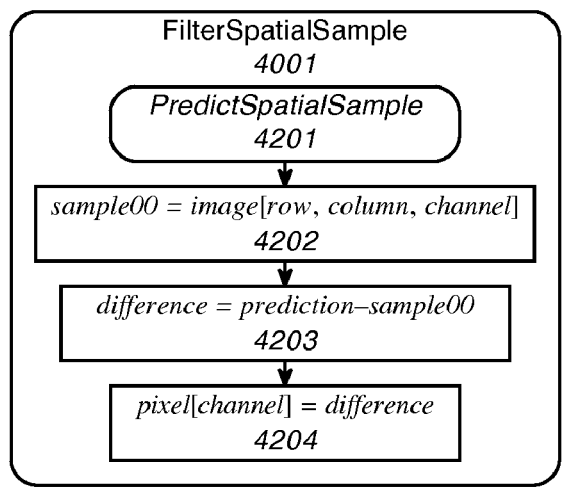
FIG. 42 is a process-flow diagram of the filter-spatial-sample step in FIG. 40.

FIG. 42 shows the FilterSpatialSample procedure 4001 in detail. The current image sample is spatially predicted by procedure PredictSpatialSample 4201, the actual current input sample is retrieved from the image by three-dimensional array access 4202, subtracted from the predicted value in 4203, and the resulting difference stored as the spatial residual in the appropriate channel of a pixel buffer for the spectral filter in 4204.

Figure 44:
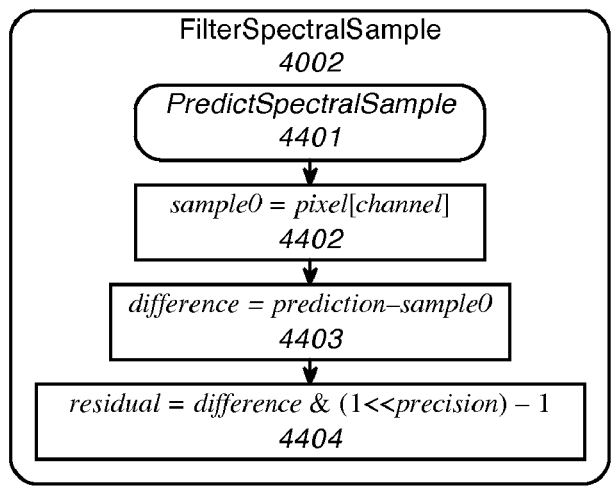
FIG. 44 is a process-flow diagram of the filter-spectral-sample step in FIG. 40.

FIG. 44 shows subsequent procedure FilterSpectralSample 4002 in detail. The current spatial residue sample is spectrally predicted by procedure PredictSpectralSample 4401, the actual current spectral residue sample is retrieved from the pixel buffer in 4402, subtracted from the prediction in 4403, masked to the precision of the original image samples in 4404, and the resulting spatiospectral residual output to the encoder.

Figure 45:
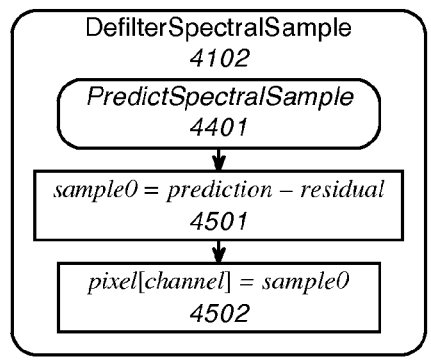
FIG. 45 is a process-flow diagram of the defilter-spectral-sample step in FIG. 41.

FIG. 45 shows the opposite procedure, DefilterSpectralSample 4102, in detail. The current spatial residue sample is spectrally predicted by procedure PredictSpectralSample 4401, the spatiospectral residual output by the decoder subtracted from the prediction in 4501, and the resulting difference stored as the current spatial residue sample in a pixel buffer in 4502.

Figure 43:
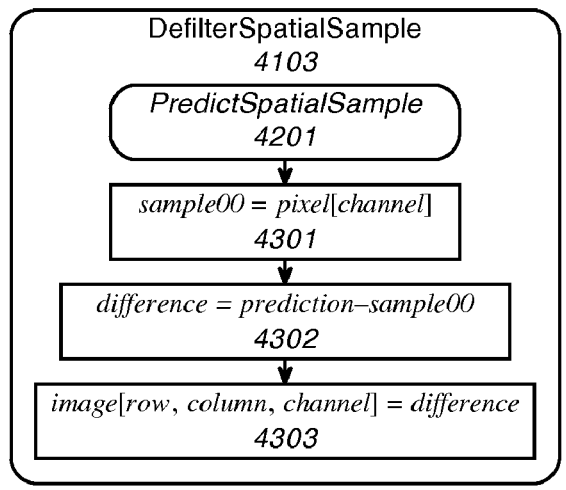
FIG. 43 is a process-flow diagram of the defilter-spatial-sample step in FIG. 41.

FIG. 43 shows subsequent procedure, DefilterSpatialSample 4103, in detail. The current image sample is spatially predicted by procedure PredictSpatialSample 4201, the spatial residual output by the spectral defilter is retrieved from the pixel buffer in 4301, subtracted from the prediction in 4302, and the resulting difference stored as the current image sample by three-dimensional array access in 4303.

Figure 46:
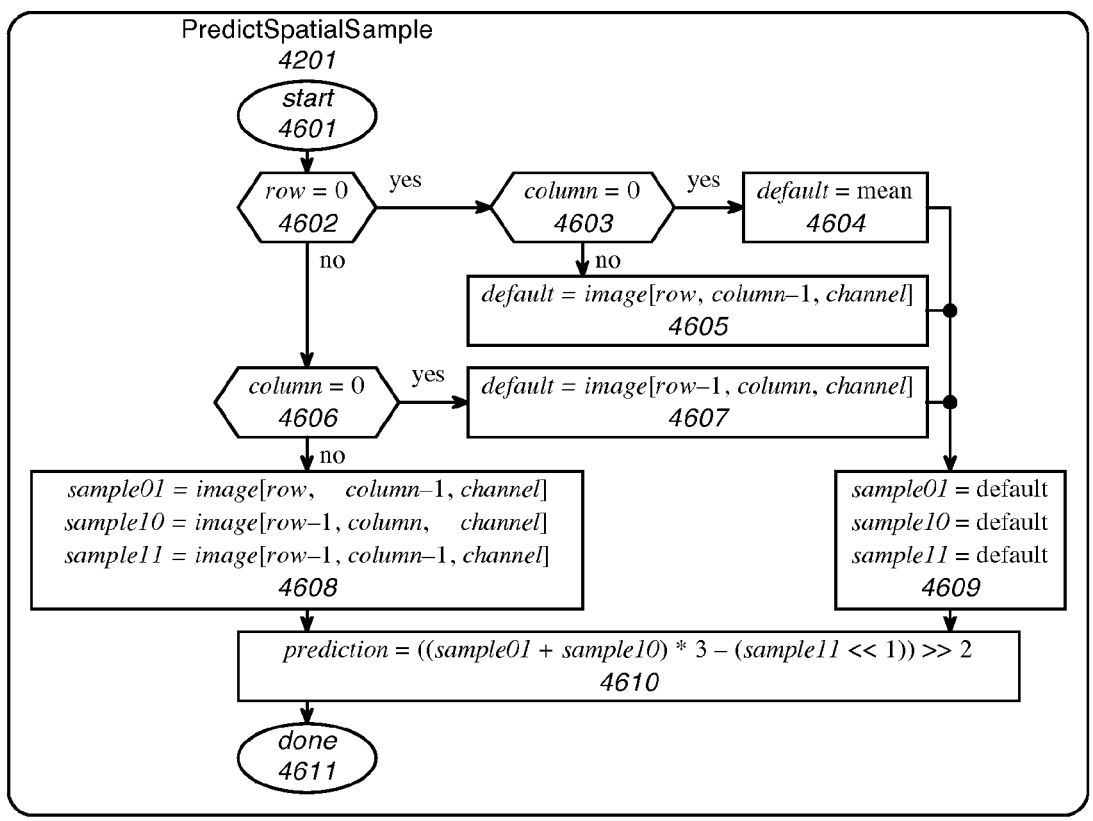
FIG. 46 is a process-flow diagram of the predict-spatial-sample step in FIGS. 42 and 43.

FIG. 46 shows the process flow for a uniform-kernel implementation of PredictSpatialSample procedure 4201. For the first row and column, the default value is set to the ensemble mean in 4604. For the remainder of the first row, the default value is set to the sample in the preceding column in 4605, while for the remainder of the first column, the default value is set to the sample in the preceding row in 4607. In all three of these boundary cases, the three spatial contextual samples are all set to the default value in 4609, while in all nonboundary cases, they are set to the actual spatial contextual samples by three-dimensional array access. These three values are then combined in the proportion 3:3:−2, normalized, and output as the predicted value in 4610 to the spatial (de-)filter.

Figure 47:
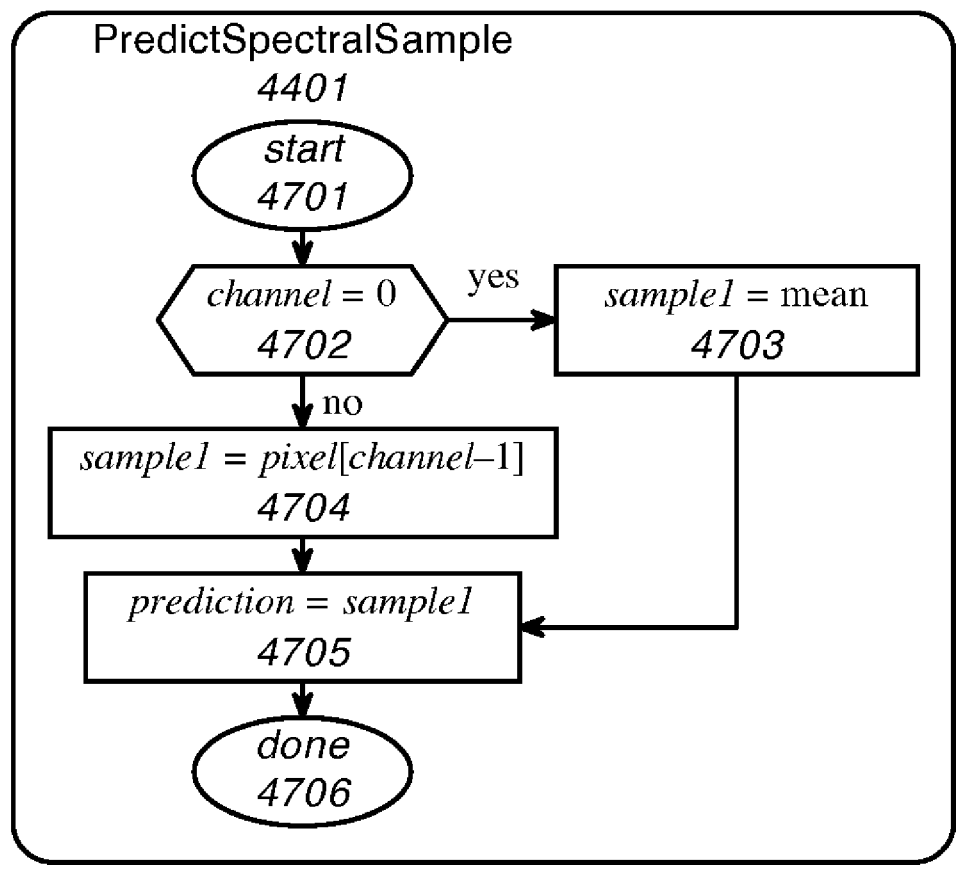
FIG. 47 is a process-flow diagram of the predict-spectral-sample step in FIGS. 44 and 45.

FIG. 47 shows the process flow for PredictSpectralSample procedure 4401. For the first channel, the spectral contextual sample is set to the ensemble mean in 4703. For the remaining channels, it is set to the value of the preceding channel retrieved from the pixel buffer in 4704, which holds the spatial residue for the current pixel. The prediction is then set to the contextual sample and output in 4705 to the spectral (de-)filter.

Figure 48:
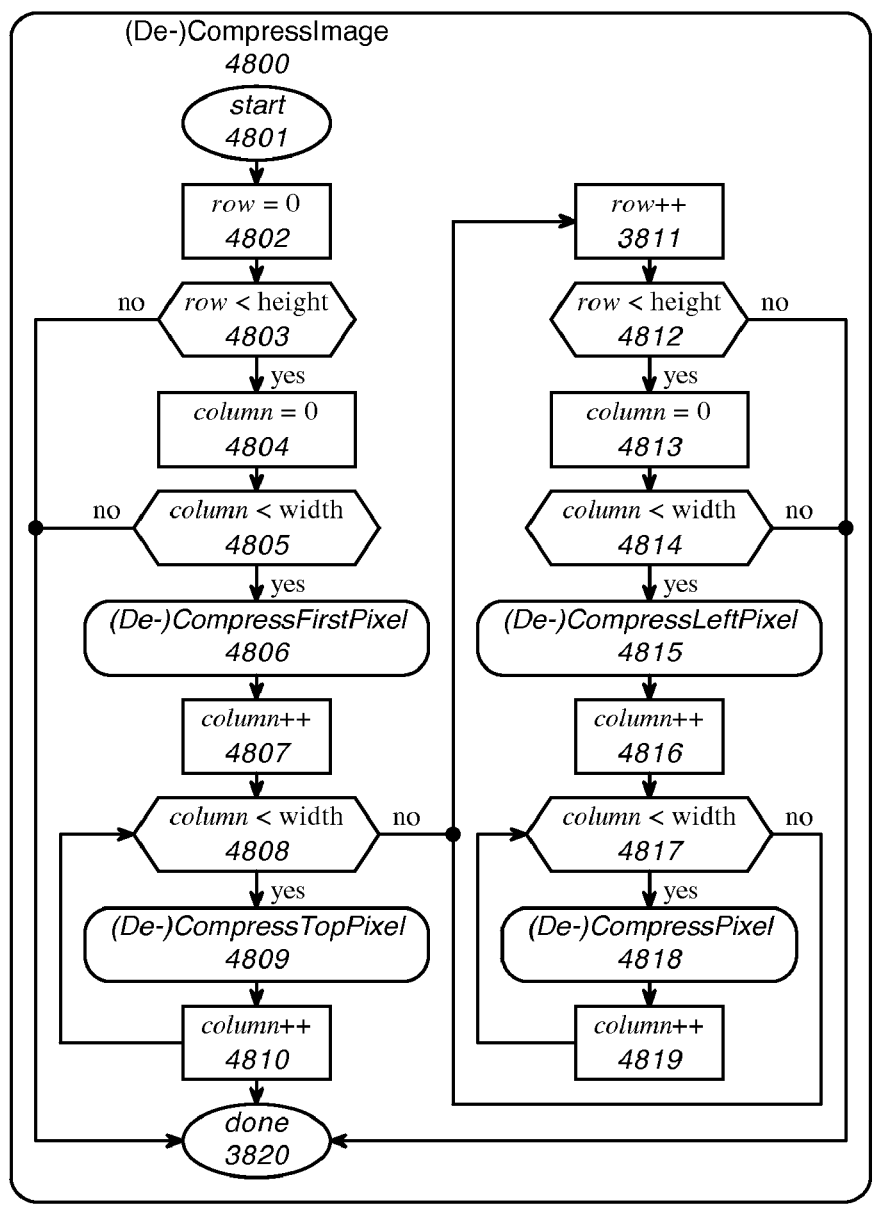
FIG. 48 is a fast process-flow diagram of the (de-)compressor for a 2 dimensional color image.

FIG. 48 shows the process flow for a fast implementation of the image (de-)compressor optimized for a sequential processor and tailored for two-dimensional color images. The (De-)CompressImage procedure executes a two-level nested loop, processing the pixel in every column in every row, with four specialized pixel-compression procedures: a (De-)CompressFirstPixel procedure 4806 preceding all loops, a (De-)CompressTopPixel procedure 4809 with its own column loop preceding the row loop, a (De-)CompressLeftPixel procedure 4815 preceding the inner column loop, and an interior (De-)CompressPixel procedure 4818 in the innermost loop.

Figure 49:
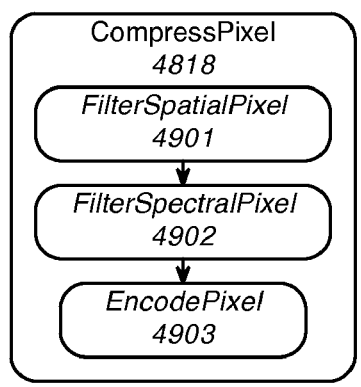
FIG. 49 is a process-flow diagram of the compress-pixel steps in FIG. 48.
Figure 50:
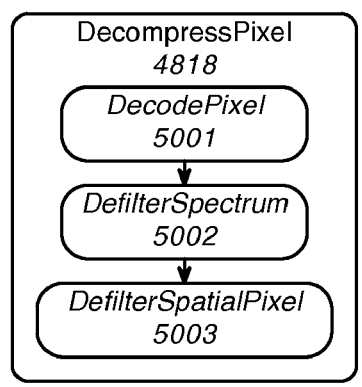
FIG. 50 is a process-flow diagram of the decompress-pixel steps in FIG. 48.

FIG. 49, representing any of the CompressPixel procedures in FIG. 48, reveals these procedures to consist of three sequential subprocedures: FilterSpatialPixel 4901, FilterSpectrum 4902, and EncodePixel 4903. FIG. 50, representing any of the DecompressPixel procedures in FIG. 48, reveals these procedures to consist of the opposite three subprocedures in the opposite order DecodePixel 5001, DefilterSpectrum 5002, and DefilterSpatialPixel 5003.

Figure 51:
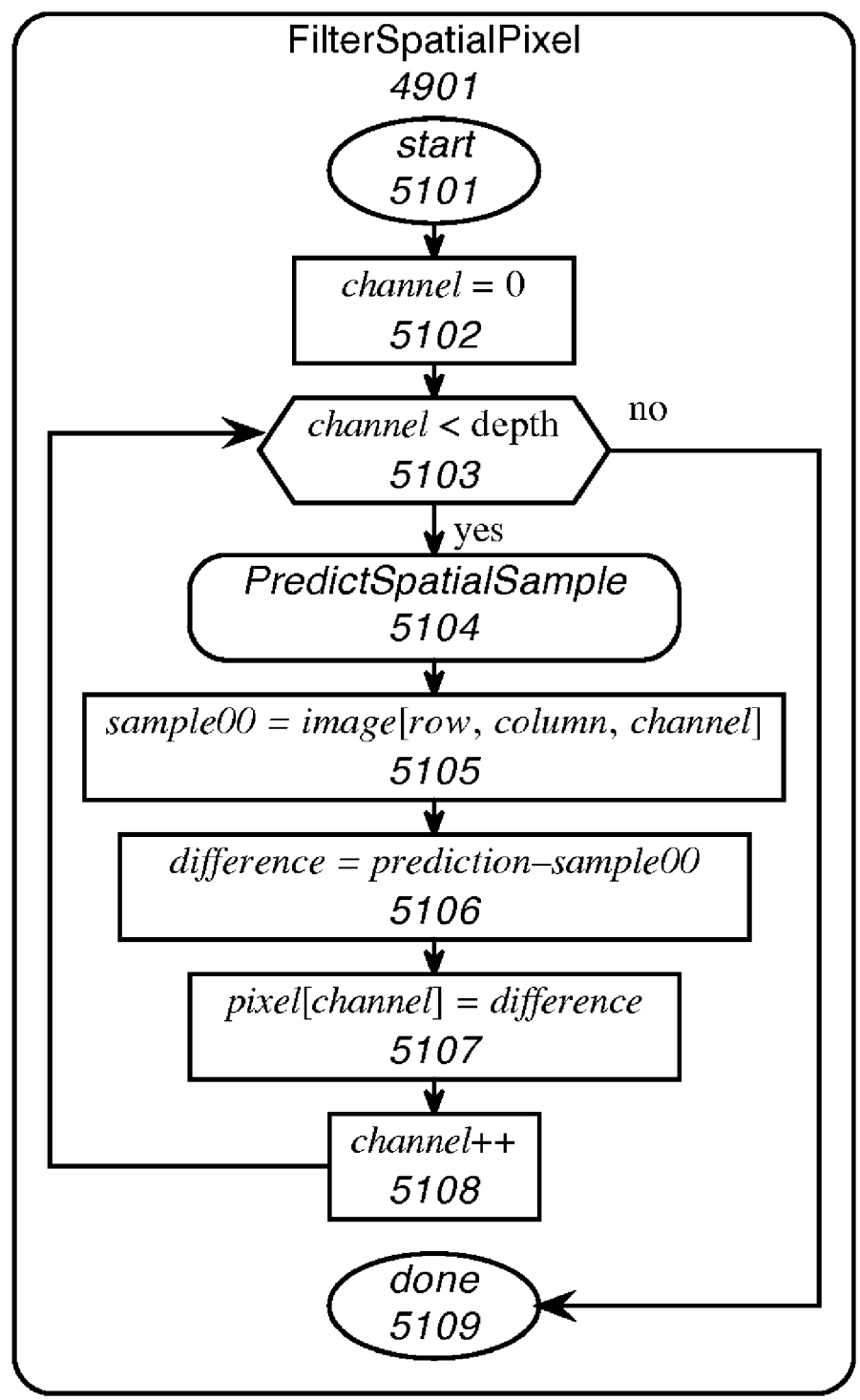
FIG. 51 is a process-flow diagram of the filter-spatial-pixel step in FIG. 49.

FIG. 51, representing the FilterSpatialPixel subprocedure 4901 for any of the CompressPixel procedures in FIG. 48, executes a channel loop, processing each component in the current pixel. Inside the loop, the current image sample is spatially predicted by the appropriate version of subprocedure PredictSpatialSample 5104, the actual current input sample is retrieved from the image by three-dimensional array access 5105, subtracted from the predicted value in 5106, and the resulting difference stored as the spatial residual in the appropriate channel of a pixel buffer for the spectral filter in 5107.

Figure 52:
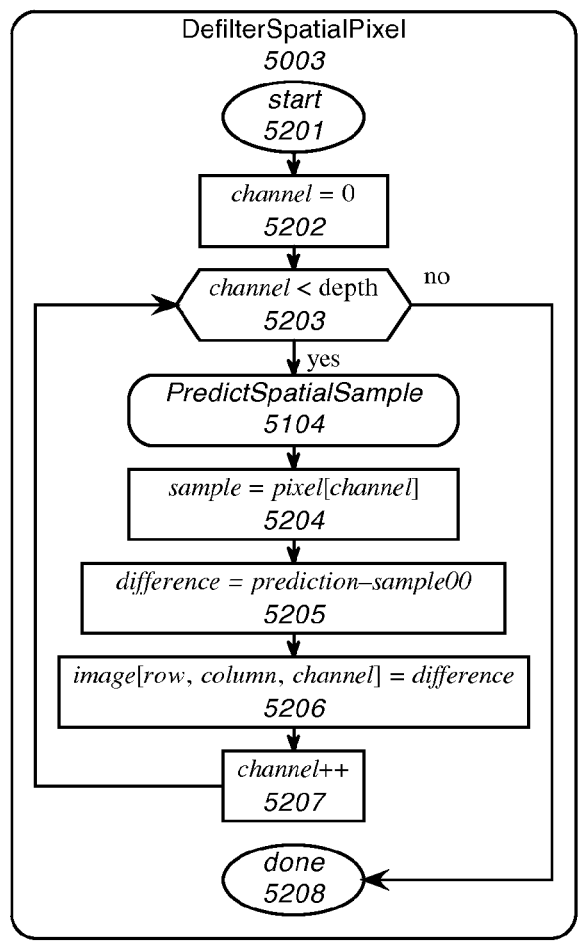
FIG. 52 is a process-flow diagram of the defilter-spatial-pixel step in FIG. 50.

FIG. 52, representing the DefilterSpatialPixel subprocedure 5003 for any of the DecompressPixel procedures in FIG. 48, executes the same channel loop. Inside the loop, the current image sample is spatially predicted by the appropriate version of subprocedure PredictSpatialSample 5104, the spatial residual is retrieved from the pixel buffer in 5204, subtracted from the prediction in 5205, and the resulting difference stored as the current image sample by three-dimensional array access in 5206.

Figure 53:
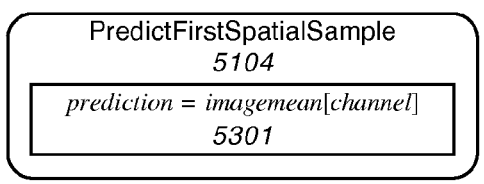
FIGS. 53, 54, 55, and 56 are process-flow diagrams of different cases of the predict-spatial-sample step in FIGS. 51 and 52.
Figure 54:
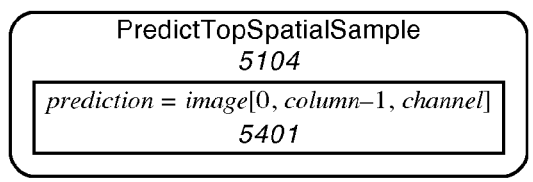
Figure 55:
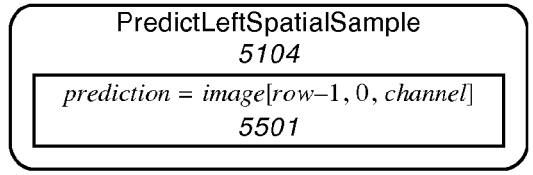
Figure 56:
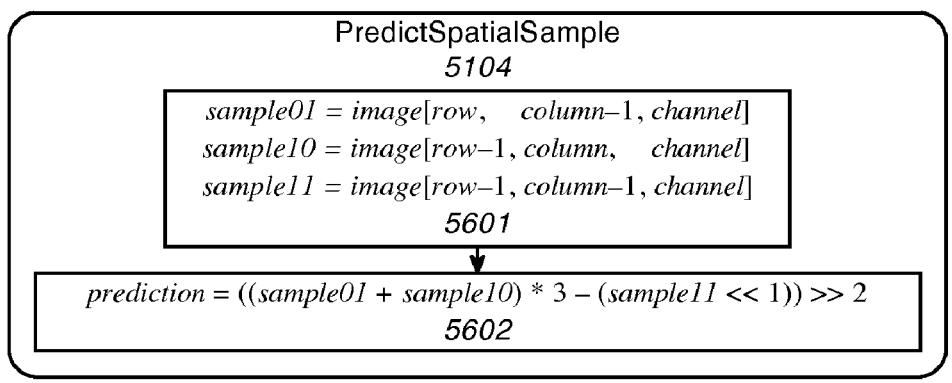

Subprocedure PredictSpatialSample in FilterSpatialPixel 4901 and DefilterSpatialPixel 5003 is expanded differently depending on the context from which these are invoked in FIG. 48. For the (De-)CompressFirstPixel procedure 4806, it is expanded as subprocedure PredictFirstSpatialSample, shown in FIG. 53, which sets the prediction to the image mean in 5301. For procedure (De-)CompressTopPixel 4809, it is expanded as subprocedure PredicTopSpatialSample, shown in FIG. 54, which sets the prediction to the corresponding sample in the preceding column in 5401 by three-dimensional array access. For procedure (De-)CompressLeftPixel 4815, it is expanded as subprocedure PredictLeftSpatialSample, shown in FIG. 55, which sets the prediction to the sample in the preceding row in 5502. And for the (De-)CompressPixel procedure 4818, it is expanded as PredictSpatialSample, shown in FIG. 56, which retrieves all three contextual spatial samples by three-dimensional array access in 5601, combines them in the proportion 3:3:−2, normalizes them, and outputs the result as the prediction in 5602.

Figure 57:
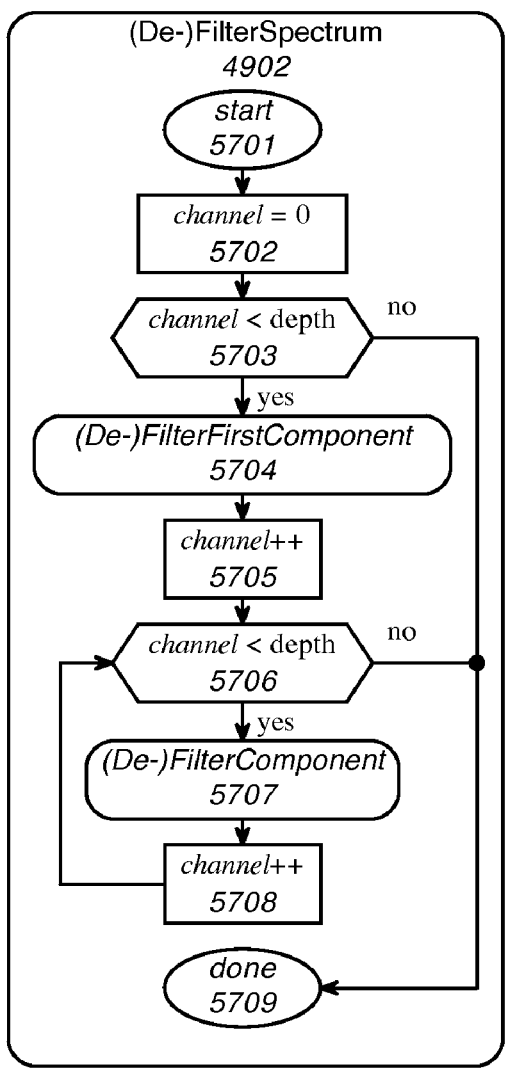
FIG. 57 is a process-flow diagram of the (de-)filter-spectrum step in FIGS. 49 and 50.

FIG. 57 shows the (De-)FilterSpectrum subprocedure 4902 in detail. The first channel is processed separately in subprocedure (De-)FilterFirstComponent 5704, and then, inside a channel loop, the remaining channels are processed by subprocedure (De-)FilterComponent 5707.

Figure 58:
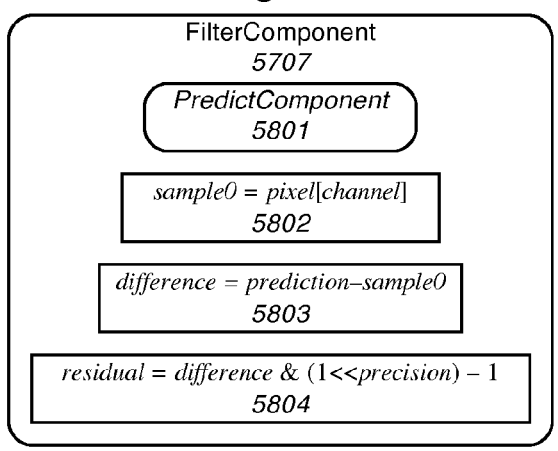
FIG. 58 is a process-flow diagram of the filter-component step in FIG. 57.

Subprocedure FilterComponent 5707 is shown in FIG. 58, which spectrally predicts the current spectral component of the spatial residue in subprocedure PredictComponent 5801, retrieves the actual current spatial residue value from the pixel buffer in 5802, subtracts it from the prediction in 5803, masks it to the precision of the original image samples in 5804, and outputs the resulting spatiospectral residual to the encoder.

Figure 59:
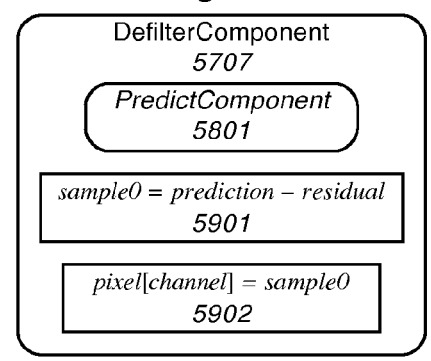
FIG. 59 is a process-flow diagram of the defilter-component step in FIG. 57.

Opposite subprocedure DefilterComponent 5707, shown in FIG. 59, spectrally predicts the current spectral component of the spatial residue in subprocedure PredictComponent 5801, subtracts the spatiospectral residual from the prediction in 5901, and stores the resulting spatial residual in the pixel buffer in 5902.

Figure 60:
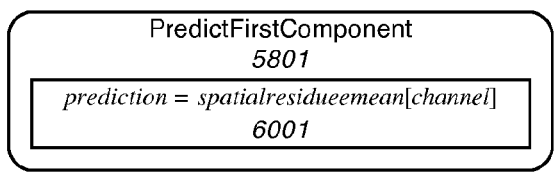
FIGS. 60 and 61 are process-flow diagrams of different cases of the predict-component step in FIGS. 58 and 59.
Figure 61:
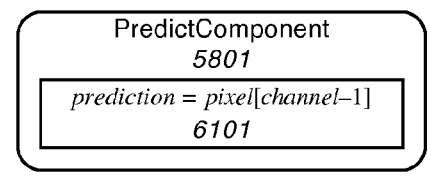

Subprocedure PredictComponent in (De-)FilterComponent is expanded differently depending on the context from which the latter is invoked in (De-)FilterSpectrum in FIG. 57. Under (De-)FilterFirstComponent 5704, it is expanded as PredictFirstComponent, shown in FIG. 60, which sets the prediction to the ensemble mean in 6001. Under (De-)FilterComponent 5707, it is expanded as PredictComponent, shown in FIG. 61, which sets the prediction to the value of the preceding spectral component in the pixel buffer in 6101.

Figure 62:
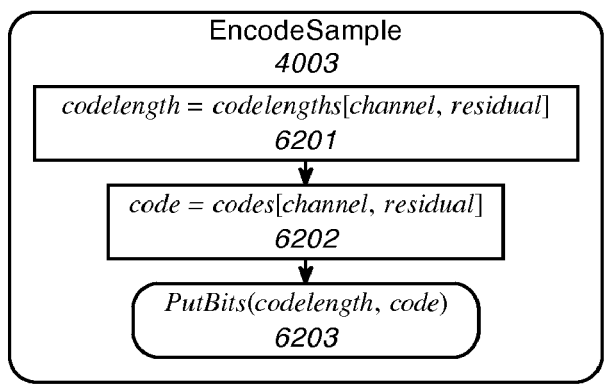
FIG. 62 is a process-flow diagram of the encode-sample step in FIG. 49.

FIG. 62 shows procedure EncodeSample 4003 in detail. The current channel and the current residual are used to look up the code-length from the code-length tables in 6201 and the code from the code tables in 6202. These are passed to subprocedure PutBits (not detailed) 6203, which outputs codelength bits of the code to the codestream.

Figure 63:
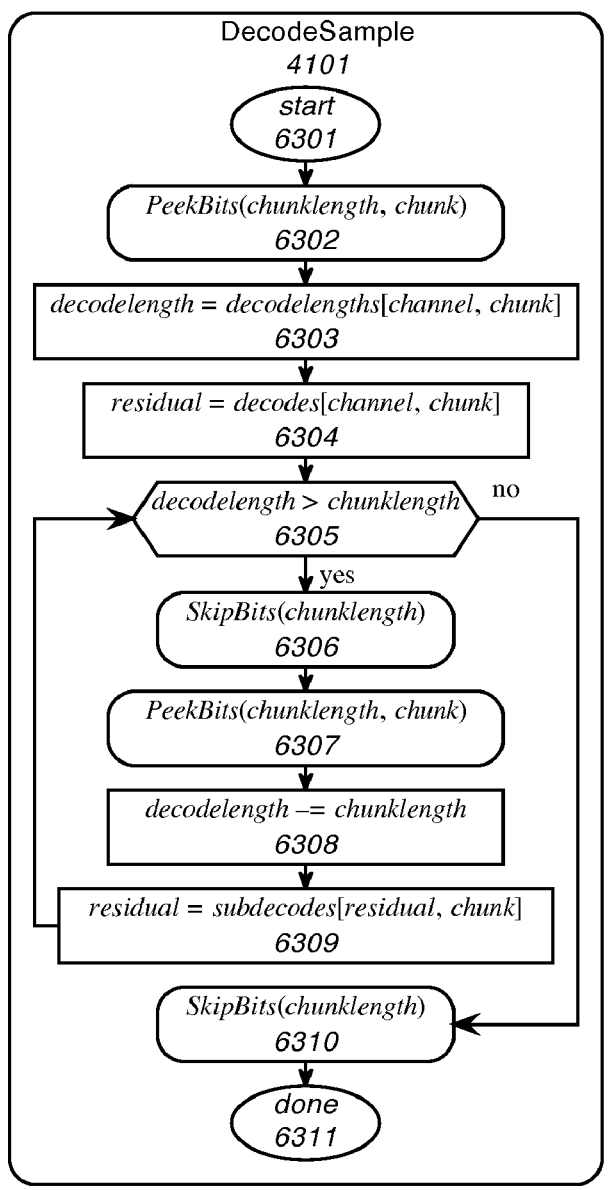
FIG. 63 is a process-flow diagram of the decode-sample step in FIG. 50.

FIG. 63 shows procedure DecodeSample 4101 in detail. Subprocedure PeekBits (not detailed) 6302 retrieves one code chunk from the codestream without advancing the codestream. The current channel and this chunk are used to look up the decode-length from the decode-length tables in 6303 and the provisional residual from the decode tables in 6304. If the decode length is no greater than the chunk length, the codestream is advanced by the decode-length using subprocedure SkipBits (not detailed) in 6309, and the residual is returned to the spectral defilter. If the decode length is longer than the chunk length, the codestream is advanced by one chunk using SkipBits in 6306, another chunk is retrieved from the codestream using PeekBits in 6307, the decodelength is decremented by one chunk in 6308, and the old provisional residual (actually a subtable index) and the new chunk are used to look up a new (provisional) residual in 6309. Then the remaining decode-length is checked again, the cycle repeated as necessary.

Code Table Examples

R'G'B' 8b p code lengths, first channel: {
    3, 3, 4, 4, 5, 5, 5, 6, 6, 6, 7, 7, 7, 7, 7, 8, 8, 8, 8, 8, 9, 9, 9, 9, 9, 9, 9,10,10,10,10,
    10,10,10,10,11,11,11,11,11,11,11,11,11,11,12,12,12,12,12,12,12,12,12,13,13,13,13,13,13,13,13,
    13,13,13,13,13,14,14,14,14,14,14,14,14,14,14,14,14,14,14,15,15,15,15,15,15,15,15,15,15,15,
    15,15,15,15,15,15,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,15,15,15,15,
    15,15,15,15,15,15,15,15,15,15,15,15,15,14,14,14,14,14,14,14,14,14,14,14,14,14,14,13,13,13,
    10,10,10,10,10, 9, 9, 9, 9, 9, 9, 8, 8, 8, 8, 8, 7, 7, 7, 7, 7, 6, 6, 6, 5, 5, 4, 4, 4,
};
R'G'B' 8b p code lengths, subsequent channels: {
    2, 2, 4, 4, 6, 7, 9, 9,10,11,11,12,12,12,13,13,13,13,14,14,14,14,14,14,15,15,15,15,15,
    15,15,15,15,15,15,15,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16, -continued

```
    16,16,16,16,16,16,16,16,16,16,16,16,16,16,16,16,16,16,16,16,16,16,16,16,16,16,15,15,15,15,15,
    15,15,15,15,15,15,14,14,14,14,14,14,14,14,13,13,13,13,12,12,12,11,11,11,10, 9, 9, 8, 6, 4, 3, 3,
};
Y'CbCr 10b 4:4:4p code lengths, luma channel: {
    4, 5, 5, 5, 5, 5, 5, 6, 6, 6, 6, 6, 6, 7, 7, 7, 7, 7, 7, 7, 8, 8, 8, 8, 8, 8, 8, 8, 8, 8,
    8, 9, 9, 9, 9, 9, 9, 9, 9, 9, 9, 9, 9, 9, 9, 9, 9, 9,10,10,10,10,10,10,10,10,10,10,10,10,
    10,10,10,10,10,10,10,10,11,11,11,11,11,11,11,11,11,11,11,11,11,11,11,11,11,11,11,11,11,11,11,11
    11,11,11,12,12,12,12,12,12,12,12,12,12,12,12,12,12,12,12,12,12,12,12,12,12,12,12,12,12,12,12,12
    13,13,13,13,13,13,13,13,13,13,13,13,13,13,13,13,13,13,13,13,13,13,13,13,13,13,13,13,13,13,
    13,13,13,13,14,14,14,14,14,14,14,14,14,14,14,14,14,14,14,14,14,14,14,14,14,14,14,14,14,14,
    14,14,14,14,14,14,14,14,14,14,14,14,14,14,14,14,14,15,15,15,15,15,15,15,15,15,15,15,15,15
    15,15,15,15,15,15,15,15,15,15,15,15,15,15,15,15,15,15,15,15,15,15,15,15,15,15,15,15,15,15,
    15,15,15,15,15,15,15,15,15,15,15,15,15,15,15,15,15,15,15,15,15,15,15,15,15,16,16,16,16,16,
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16
    16,16,16,16,16,16,16,15,15,15,15,15,15,15,15,15,15,15,15,15,15,15,15,15,15,15,15,15,15,15,15
    15,15,15,15,15,15,15,15,15,15,15,15,15,15,15,15,15,15,15,15,15,15,15,15,15,15,15,15,15,15,
    15,15,15,15,15,15,15,15,15,15,15,15,15,15,14,14,14,14,14,14,14,14,14,14,14,14,14,14,14,14,
    14,14,14,14,14,14,14,14,14,14,14,14,14,14,14,14,14,14,14,14,14,14,14,14,14,14,14,14,13,13,
    13,13,13,13,13,13,13,13,13,13,13,13,13,13,13,13,13,13,13,13,13,13,13,13,13,13,13,13,13,13,
    13,13,12,12,12,12,12,12,12,12,12,12,12,12,12,12,12,12,12,12,12,12,12,12,12,12,12,12,12,11,
    11,11,11,11,11,11,11,11,11,11,11,11,11,11,11,11,11,11,11,11,11,11,11,11,11,11,10,10,10,10,10,
    10,10,10,10,10,10,10,10,10,10,10,10,10,10, 9, 9, 9, 9, 9, 9, 9, 9, 9, 9, 9, 9, 9, 9, 9, 9,
    8, 8, 8, 8, 8, 8, 8, 8, 8, 8, 8, 8, 8, 7, 7, 7, 7, 7, 7, 7, 6, 6, 6, 6, 6, 6, 6, 5, 5, 5, 5, 5,
};
Y'CbCr 10b 4:4:4p, chroma channels {
    2, 3, 3, 4, 5, 5, 6, 7, 8, 9, 9,10,10,10,11,11,12,12,12,12,12,13,13,13,13,13,13,14,14,14,14,
    14,14,14,14,14,15,15,15,15,15,15,15,15,15,15,15,15,15,15,15,15,15,15,15,15,15,16,16,16,16,16,16,
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16,
    16,16,16,16,16,16,16,16,16,16,16,16,16,16,16,16,16,16,16,16,16,16,16,16,16,16,16,16,16,16,
    16,16,16,16,16,16,16,16,15,15,15,15,15,15,15,15,15,15,15,15,15, 15,15,15,15,15,15,14,14,14,
    14,14,14,14,14,14,13,13,13,13,13,13,12,12,12,12,11,11,11,10,10, 9, 9, 8, 8, 7, 6, 5, 4, 4, 3,
};
```

The embodiments of the invention in which an exclusive property or privilege is claimed are defined as follows:

1. A method of compressing an image, wherein the image is represented as digital data corresponding to pixel values of a pixel array of at least two dimensions, and wherein the image would occupy more digital storage space prior to compressing than after compressing, for most expected images, the method comprising:

reading the image from digital storage, wherein the digital data representing the image includes a plurality of samples, wherein some pairs of the plurality of samples can be adjacent samples and some pairs of the plurality of samples can be corner samples;

applying, to the image, a spatial prediction filter combining two of the adjacent samples and one of the corner samples in the proportion 3:3:−2, to form a compressed image; and outputting the compressed image.

2. The method of claim 1, further comprising applying, to the image, a spectral prediction filter in conjunction with the spatial prediction filter.

3. The method of claim 1, wherein the digital data of the image corresponds to pixel values of a pixel array of two dimensions, a vertical dimension and a horizontal dimension.

4. The method of claim 1, wherein the digital data of the image corresponds to pixel values of a pixel array of three dimensions.

5. The method of claim 1, wherein the digital data of the image corresponds to pixel values of a pixel array that has at least one time dimension.

6. The method of claim 1, wherein the digital data of the image corresponds to pixel values that comprise a single component.

7. The method of claim 1, wherein the digital data of the image corresponds to pixel values that comprise three components.

8. The method of claim 1, wherein an entropy coder uses a static prefix code and uses chunked partial decode tables to decode embedded prefix codes more than one bit at a time, such that a set of more common codes are decoded in a single chunk and a set of less common codes are decoded in two or more chunks, and wherein decoding comprises:

(a) inputting a code stream in a sequential order;
(b) using a value of a current chunk of the code stream to index into a primary decode table for looking up a current key and an initial image residue value;
(c) if the current key is greater than a current chunk length:
  (i) advancing the code stream by the current chunk length;
  (ii) using the current key and the current chunk of the code stream to index into a two-dimensional subdecode table for looking up a new key and a partial residue value;
  (iii) increasing the image residue value by the partial residue value; and
  (iv) repeating step (c) as necessary; and
(d) if the current key is not greater than the current chunk length:
  (i) advancing the code stream by the current key; and
  (ii) outputting the image residue value.

9. A method of compressing an image, wherein the image is represented as digital data corresponding to pixel values of a pixel array of at least two dimensions, and wherein the image would occupy more digital storage space prior to compressing than after compressing, for most expected images, the method comprising:

reading the image from digital storage;

representing the image with at least a sequence of codes, wherein each code corresponds to image data and each code has a length;

generating a compressed image from the image, constraining embedded prefix codes that represent portions of the digital data such that all codes with the same prefix chunk have equal length;

accessing chunked decode tables comprising at least two chunked decode tables including a first chunked decode table for a first set of codes having one prefix chunk length and a second chunked decode table for a second set of codes having lengths greater than the one prefix chunk length, wherein the first chunked decode table and the second chunked decode table each have partial residues for codes in the second set of codes; and decoding embedded prefix codes more than one bit at a time.

10. The method of claim 9, further comprising applying a spatial prediction filter.

11. A digital image processing device, having limited memory storage therein, comprising:

an input for image data, wherein the image is represented as digital data corresponding to pixel values of a pixel array of at least two dimensions, and wherein the image would occupy more of the limited memory storage prior to compressing than after compressing, for most expected images;

a compressor that compresses the input image to form a compressed image, wherein the digital data representing the input image includes a plurality of samples, wherein some pairs of the plurality of samples can be adjacent samples and some pairs of the plurality of samples can be corner samples;

a spatial prediction filter, coupled to an input of the compressor, that combines two of the adjacent samples of the input image and one of the corner samples of the input image in the proportion 3:3:−2, to form a compressed image value; and storage for a plurality of the compressed image values, thereby storing the compressed image.

12. The digital image processing device of claim 11, further comprising a spectral prediction filter coupled to an output of the spatial prediction filter.

13. The digital image processing device of claim 11, wherein the digital data of the input image corresponds to pixel values of a pixel array of two dimensions, a vertical dimension and a horizontal dimension.

14. The digital image processing device of claim 11, wherein the digital data of the input image corresponds to pixel values of a pixel array of three dimensions.

15. The digital image processing device of claim 11, wherein the digital data of the input image corresponds to pixel values of a pixel array that has at least one time dimension.

16. The digital image processing device of claim 11, wherein the digital data of the input image corresponds to pixel values that comprise a single component.

17. The digital image processing device of claim 11, wherein the digital data of the input image corresponds to pixel values that comprise three components.

* * * * *